United States Patent [19]
Ito et al.

[11] Patent Number: 5,721,904
[45] Date of Patent: Feb. 24, 1998

[54] DATABASE ACCESS SYSTEM AND METHOD OF CONTROLLING ACCESS MANAGEMENT TO A DATABASE ACCESS SYSTEM FOR A PLURALITY OF HETEROGENEOUS DATABASE SERVERS USING SQL

[75] Inventors: Hiromichi Ito; Satoshi Kikuchi; Keiichi Nakane; Hisashi Hashimoto, all of Yokohama; Eisaku Nishiyama, Ebina; Yusuke Hino, Hadano, all of Japan

[73] Assignee: Hitachi, Ltd., Tokyo, Japan

[21] Appl. No.: 355,891

[22] Filed: Dec. 14, 1994

[30] Foreign Application Priority Data

Dec. 20, 1993 [JP] Japan ................ 5-319394
Jun. 8, 1994 [JP] Japan ................ 6-126573

[51] Int. Cl.$^6$ ................................ G06F 17/30
[52] U.S. Cl. ................ 395/608; 395/612; 395/7.59; 395/604; 395/613; 364/224.1; 364/283.4
[58] Field of Search ................ 395/600, 575, 395/500, 800, 200, 612, 611, 601, 759; 364/200, 900, 90

[56] References Cited

U.S. PATENT DOCUMENTS

| | | | |
|---|---|---|---|
| 4,425,626 | 1/1984 | Parmet et al. | 364/900 |
| 4,559,614 | 12/1985 | Peek et al. | 364/900 |
| 5,031,089 | 7/1991 | Liu et al. | 364/200 |
| 5,167,035 | 11/1992 | Mann et al. | 395/575 |
| 5,230,073 | 7/1993 | Gausmann et al. | 395/600 |
| 5,278,978 | 1/1994 | Demers et al. | 395/600 |
| 5,341,478 | 8/1994 | Travis, Jr. et al. | 395/200 |
| 5,408,649 | 4/1995 | Beshears et al. | 395/575 |
| 5,416,917 | 5/1995 | Adair et al. | 395/500 |
| 5,440,744 | 8/1995 | Jacobson et al. | 395/650 |
| 5,511,186 | 4/1996 | Carhart et al. | 395/600 |
| 5,546,575 | 8/1996 | Potter et al. | 395/612 |

FOREIGN PATENT DOCUMENTS

| | | |
|---|---|---|
| 0 449 449 A2 | 3/1991 | European Pat. Off. . |
| 0 449 493 A2 | 3/1991 | European Pat. Off. . |
| 0 449 494 A2 | 3/1991 | European Pat. Off. . |

OTHER PUBLICATIONS

*The Practical SQL Handbook*, published by Addison-Wesley Publishing Company, Inc., pp. 326–341, No date.

Primary Examiner—Thomas G. Black
Assistant Examiner—Charles L. Rones
Attorney, Agent, or Firm—Fay, Sharpe, Beall, Fagan, Minnich & McKee

[57] ABSTRACT

A database access system for a distributed system, in which the database access load is distributed among a plurality of gateways, and an arbitrary character code set can be used for database access. After the lapse of a predetermined time length, processings for particular database access are terminated. An error of a DBMS or a component on the gateway is detected by a client. The gateway detects an error of the client in connection. The client notifies the character code set identification information of the character code used for outputting the request to the gateway, and the gateway converts the character code for the request and a response to the client. The gateway receives an access request, secures the connection with a database access language conversion unit, and sends the language converted to a DBMS. In the absence of a response after the lapse of a predetermined time length, the connection with the database access language conversion unit is terminated and an error is notified to the client. Also, an error monitor request is outputted at regular intervals of time, and an error is notified to the client in the case where there is no response to the error monitor request after the lapse of a predetermined time length.

5 Claims, 34 Drawing Sheets

| SERVER COMPONENT NAME | ADDRESS | PORT NO. | STATUS |
|---|---|---|---|
| IDAS | 40.12.5.0 | 150 | RUN |
| IDAS | 40.12.5.3 | 150 | RUN |
| DBMS_A | 40.12.5.0 | 152 | RUN |
| DBMS_A | 40.12.5.6 | 150 | STOP |
| DBMS_A | 40.12.5.2 | 150 | FAULT |
| DBMS_A | 40.12.5.8 | 150 | RUN |
| DBMS_B | 40.12.5.0 | 154 | RUN |
| DBMS_B | 40.12.5.3 | 154 | RUN |
| . | . | . | . |
| . | . | . | . |
| . | . | . | . |

```
SELECT Name, SaleNum
FROM DBMS A#SALES, DBMS B#SALESDATA      ⎬—2301
WHERE SaleNum < > 0
```

```
SELECT Name, SaleNum
FROM SALES                ⎬—2302
WHERE SaleNum < > 0
```

```
SELECT Name, SaleNum
FROM SALESDATA            ⎬—2303
WHERE SaleNum < > 0
```

FIG.24

```
SELECT Name, SaleNum
FROM SALES                ⎬—2402
WHERE SaleNum ! = 0
```

```
SELECT Name, SaleNum
FROM SALESDATA            ⎬—2403
WHERE SaleNum ^ = 0
```

FIG.35

| SERVER COMPONENT NAME | ADDRESS | PORT NO. | STATUS |
|---|---|---|---|
| IDAS | 40.12.5.0 | 150 | RUN |
| DBMS_A | 40.12.5.0 | 152 | RUN |
| DBMS_B | 40.12.5.0 | 154 | RUN |
| ⋮ | ⋮ | ⋮ | ⋮ |

1701    1702    1703    1704

DATABASE ACCESS SYSTEM AND METHOD OF CONTROLLING ACCESS MANAGEMENT TO A DATABASE ACCESS SYSTEM FOR A PLURALITY OF HETEROGENEOUS DATABASE SERVERS USING SQL

BACKGROUND OF THE INVENTION

The present invention relates to an information processing system for accessing a data base, or more in particular to a database access system and a method for controlling the same suitably applied to the case where a plurality of heterogeneous database servers are accessed from an information processing system of a client through a network.

The database systems in enterprises, with the downsizing trend, are changing from a companywide system using a mainframe computer to a departmental system distributed among departments in charge with individual businesses. In the departmental system, in order to construct an optimum system according to the contents of individual businesses, a database management system (DBMS) is employed in not a few cases. In executing the application software such as decision support, on the other hand, it is necessary to collect and analyze various data on the data bases distributed among departments of an enterprise as required.

As an application programming interface (API) for accessing a data base, a language called SQL (structured query language) is generally used. The standard specification of SQL is provided by JIS (Japanese Industrial Standards) or the like. For actual DBMS products, however, the standard specification varies from one DBMS vendor to another in detailed points. As a result, the data bases on the DBMS of different vendors cannot be accessed with the same SQL. In view of this, a gateway for converting a given SQL into an SQL specific to each vendor is commercially available. The differences in SQL specifications are described in "The Practical SQL Handbook" pp. 329–341, published by Addison-Wesley Publishing Company, Inc.

A conventional example of a heterogeneous database access system using the gateway is shown in FIG. 2. This prior art system comprises a gateway function included in a client information processing system 110 for operating an application software execution unit 111. In the example shown in FIG. 2, a LAN (Local Area Network) 100 connected to the client information processing system 110 is connected with two server information processing systems 120a, 120b, in which DBMS_A 121a and DBMS_B 121b are operated respectively. The server information processing system 120a is connected with an external memory unit 124a for holding the data of the data base 124a, and the server information processing system 120b is connected with an external memory unit 124b for holding the data of the data base 124b. DBMS_A 121a and DBMS_B 121b are for managing the data bases 124a and 124b respectively.

An access management component 112 is operated in such a manner that the SQL statement issued by the application software 111 for database access is delivered to the component of the SQL conversion unit A 115a when the destination of access is DBMS_A 121a, and to the component of the SQL conversion unit B 115b when the destination of access is DBMS_B 121b.

Each component of the SQL conversion unit A 115a and B 115b converts the received SQL statement into the specification of a target DBMS (DBMS of the access destination), and transmits the converted SQL statement to the server information processing system 120a or 120b of each target through the database driver A 122a or the database driver B 122b of each DBMS and the LAN driver 123.

The database driver A 122a, the database driver B 122b and the LAN driver 123 identical to those for the client information system 110 are mounted on the server information processing systems 120a, 120b respectively for performing the processings according to the hierarchy of the communication protocols. The SQL statement destined for DBMS_A 121a or DBMS_B 121b is retrieved from the packet data on the LAN 100 transmitted by the client information processing system, and the same SQL statement is sent to each DBMS. The result of processing at each DBMS is converted into a standard data format and a standard return code by the SQL conversion unit A 115a or SQL conversion unit B 115b along the reverse route, and then sent to the application software 111 through the access management component 112.

In this way, the gateway function is realized by the access management component and the SQL conversion unit A 115a, SQL conversion unit B 115b on the client information system, so that it is possible to access DBMSs having different SQL specifications using a single SQL specification.

A conventional example is shown in FIG. 3 in which the gateway function is realized by using a dedicated gateway information processing system 130 but not included in the client information processing system 110. In this conventional example, the SQL statement issued by the application software execution unit 111 is first sent to the gateway information processing system 130 through a database driver C 122c and a LAN driver 123. On the gateway information processing system 130, the LAN driver 123 and the database driver C 122c cause the SQL statement to be retrieved and sent to an access management component 112. Subsequent operations are similar to those of the prior art described above with reference to FIG. 2. The database on the target server information processing system 120a or 120b is accessed through the SQL conversion unit A 115a or the SQL conversion unit B 115b, the database driver A 122a or the database driver B 122b, and the LAN driver 123. The result of access is returned to the application software execution unit 111 on the client information processing system 110.

These heterogeneous database access systems are described in the Feb. 15, 1993 issue of "Nikkei Electronics", pp.138–145, published by Nikkei BP Company.

As described above, the gateway function for converting a SQL statement into the SQL specification of a target DBMS is incorporated in the client information processing system, or a dedicated gateway information processing system is provided for realizing the gateway function. In this way, it is possible to access the data bases managed by a plurality of DBMSs having different SQL specifications by an application software execution unit having a single SQL specification.

For the conventional configuration shown in FIG. 2, however, every client is required to install the SQL conversion unit and the database driver corresponding to the DBMS to be accessed. As a consequence, appropriate maintenance work is required for the SQL conversion unit and the database driver of each client each time of version-up or addition of DBMS types within the system.

With the conventional configuration shown in FIG. 3, on the other hand, the appropriate maintenance is required only with the database driver and the SQL conversion unit on the gateway information processing system. Therefore, the above-mentioned problem is solved. Since the data base is accessed always through the gateway information processing system, however, loads are concentrated on the gateway information processing system, and traffic increases on the LAN.

Also, in a method using the conventional gateway information processing system, it is impossible for a plurality of clients issuing SQLs of different specifications to access a plurality of DBMSs of different specifications.

Further, in the method using the conventional gateway information processing system, different character code sets cannot be used for each client application software.

In the prior art, accessing the database sometimes takes longer than 30 minutes. It is therefore desirable for the user to be able to set the time limit of the processing operation. In the prior art, however, the time limit cannot be set, or a value fixed for each system is set, but the time limit cannot be set freely by each user. Further, in accessing the data base through the SQL conversion unit on the gateway information processing system, the problem is that the origin of the cause cannot be traced when the processing time limit is passed. Also, in the case where a fall occurs in the DBMS or a component on the gateway information system, the time limit set to about 30 minutes must be waited before the error is clarified.

In the conventional method using the gateway information processing system, it is difficult for a plurality of clients issuing SQLs of different specifications to access a plurality of DBMSs of different specifications.

SUMMARY OF THE INVENTION

It is a first object of the invention to provide a database access system comprising language conversion means permitting clients issuing database access languages of different specifications to access DBMSs, in which the load associated with language conversion can be distributed among a plurality of information processing systems, and a method for controlling such a database access system.

A second object of the invention is to provide a database access system comprising language conversion means permitting clients issuing database access languages of different specifications to access DBMSs and a method of control thereof, in which the application software can use a character code different from that for the database management system or the gateway information processing system.

A third object of the invention is to provide a database access system comprising language conversion means permitting clients issuing database access languages of different specifications to access DBMSs and a method of control thereof, in which the access to a database can be discontinued within an arbitrary period of time.

A fourth object of the invention is to provide a database access system comprising language conversion means permitting clients issuing database access languages of different specifications to access DBMSs, and a method of control thereof, further comprising means for detecting a error of each unit.

Still another object of the invention is to provide a heterogeneous database access system permitting an application software using a SQL of non-standard specification to access a DBMS using a SQL of non-standard specification.

In order to achieve the fourth object described above, according to the invention, there is provided a database access system comprising at least one of the following means:

a client information processing system including error check means for issuing a predetermined access request for error check and sending it to the gateway information processing system each time of the lapse of a predetermined time length, and an error notification means for notifying an error to the application software execution unit unless a response is made to the access request for error check within a predetermined time length;

an access management means including an error check means for issuing an access request for error check and sending it to the database access language conversion means each time of the lapse of a predetermined time length, and an error notification means for notifying an error to the client information processing system unless a response is made to the access request for error check within a predetermined time length; and a database access language conversion means including an error check means for issuing an access request for error check and sending it to the database management system each time of the lapse of a predetermined time length, and an error notification means for notifying an error to the access management means unless a response is made to the error check access request within a predetermined time length.

Further, according to the present invention, there is provided a method for controlling the database access system comprising the above-mentioned elements.

The access management system receives an access based on an access request to a database management system described in a SQL of a predetermined specification as a parameter of the remote procedure call (RPC), determines the type of a target DBMS, and issues the RPC to the SQL conversion unit corresponding to the type of DBMS with the SQL of standard specification as a parameter.

The SQL conversion unit converts the SQL of standard specification delivered by the RPC issued from the access management means into the SQL of non-standard specification used by the target DBMS, and executes the access to the particular DBMS.

In this way, the access management means and the SQL conversion unit are connected by the RPC, and the same RPC parameter specification is used for the processing request to the access management means as for the processing request to the SQL conversion unit. Thus, in the case where the target DBMS is clear and single, the SQL conversion unit can be accessed directly by the user application software not through the access management means, thereby reducing the overhead.

Also, the access management means and the SQL conversion unit can be installed on a plurality of information processing systems, and a processing request by RPC can be issued from the access management means on a first information processing system to the SQL conversion unit on another information processing system. As a result, the processing load can be distributed among a plurality of information processing systems. Further, all the information processing systems having the access management means do not necessarily comprise the SQL conversion unit corresponding to all types of DBMSs, but any one of the information processing systems may be provided with the required type of SQL conversion unit. In this way, the introduction and maintenance become easy.

Also, a client SQL processing means is operated on an information processing system (client information processing system) including the user application software and requests other information processing system to execute the SQL issued from user application software execution unit by use of RPC. This client SQL processing means issues the RPC with the SQL from the user application software execution unit as a parameter to the SQL conversion unit on the same information processing system as the target DBMS when a single DBMS is involved, and to the access management means on a gateway information processing system different from the target DBMS when more than one DBMS is involved. As a result, the access to a single DBMS can be executed without any overhead which otherwise might occur due to the intermediary of a gateway information processing system.

The access management means receives an access with the SQL of a predetermined specification as an RPC parameter, determines the type of the target DBMS, and issues an RPC having the same content as the above-mentioned RPC to the SQL conversion unit corresponding to the type of DBMS. The SQL conversion unit converts the access request delivered thereto by the RPC issued from the access management means into an access request having the SQL specification used by the target DBMS, and executes the access to the DBMS. In the process, the character code set identification information is notified. The access management component converts the SQL statement received from the application software into a character code set interpretable by itself using a character code conversion means. As a consequence, the application software on the client information processing system can use various code sets as a unit of connection to the data base.

The processing of database access can be discontinued within a predetermined time length (time limit), in the case where any one of the client information processing system, the access management means and the database access language conversion means includes means for securing connection to the destination upon receipt of the above-mentioned request and sending the request to the destination, and means for terminating the connection and notifying an error of the request processing to the requester. Also, if the time limit is notified from the client information processing system to the access management means and from the access management means to the database access language conversion means each time of request notification, then the time limit can be freely set by the unit of connection to the data base each time of request from the application software execution unit.

Also, the time limit setting means operates in such a manner as to set a time limit as a time length shorter than the time received from the database access processing time limit notification means. Consequently, of the processing time limits used by the two time limit measuring means, the one used for the request for processing the SQL statement from the access management means to the SQL conversion unit is shorter. Thus, termination of the processing for the access management means can be prevented which otherwise might occur before the time of termination of the processing request for the SQL conversion unit which is situated beyond the access management means as viewed from the application software. Even in the case where a processing termination occurs for the SQL conversion unit, therefore, the termination notification can be received by the application software through the access management means, thereby making it possible to locate the cause of the processing time limit being passed.

The server error check PRC issue means, after the application software is connected to the data base, issues an error check RPC regularly to the access management means and the SQL conversion unit. The error check RPC causes the time limit measuring means to check whether there is a response from the server, i.e., the access management means or the SQL conversion unit within the time limit after issuance of the RPC. In the absence of a response within the time limit, an error is assumed to have occurred in the server. This makes it possible to detect an error of the access management means or the SQL conversion unit, as the case may be, before issuance of the SQL statement.

Further, the means for checking the regular issuance of the RPC monitors to see whether the error check RPC is regularly issued from the server error check RPC issuance means. In the case where the RPC is not issued regularly, an error is assumed to have occurred in the client. An error on the client side can thus be readily detected.

Furthermore, the non-standard SQL conversion unit converts the access from the user application software using a non-standard SQL into the SQL of standard specification which can be processed by the access management means. As a result, a DBMS using another non-standard SQL can be accessed from the user application software using the non-standard SQL.

BRIEF DESCRIPTION OF THE DRAWINGS

FIG. 23 is a diagram showing an example of the SQL statement processed at the access management component 112v according to the first embodiment.

FIG. 24 is a diagram showing an example of the SQL statement converted by the SQL conversion unit according to the first embodiment.

FIG. 35 is a diagram for explaining an example of the server information table according to the first embodiment.

DESCRIPTION OF THE PREFERRED EMBODIMENTS

Figure 1:
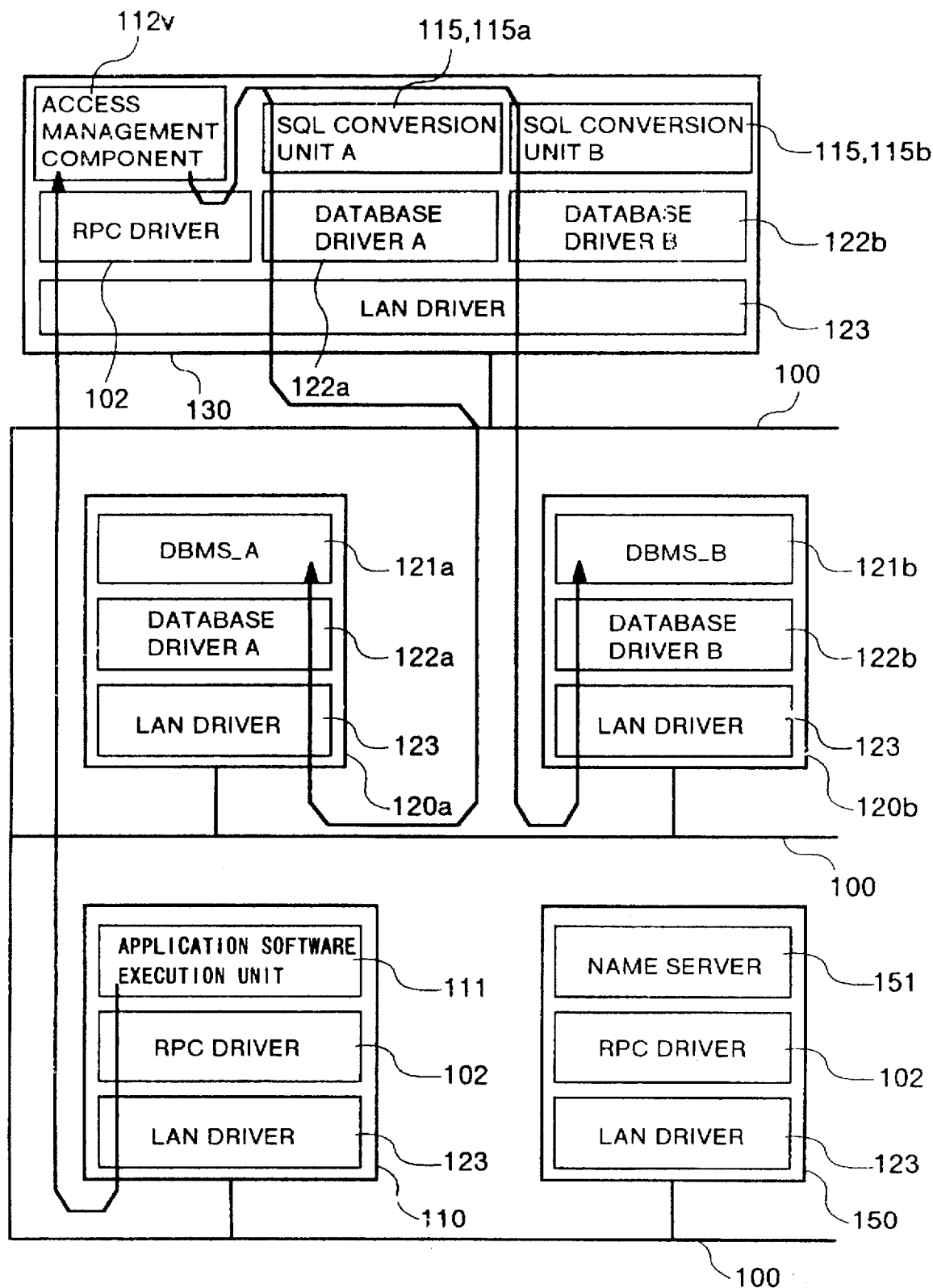
FIG. 1 is a diagram showing the configuration of a database access system according to a first embodiment.
Figure 2:
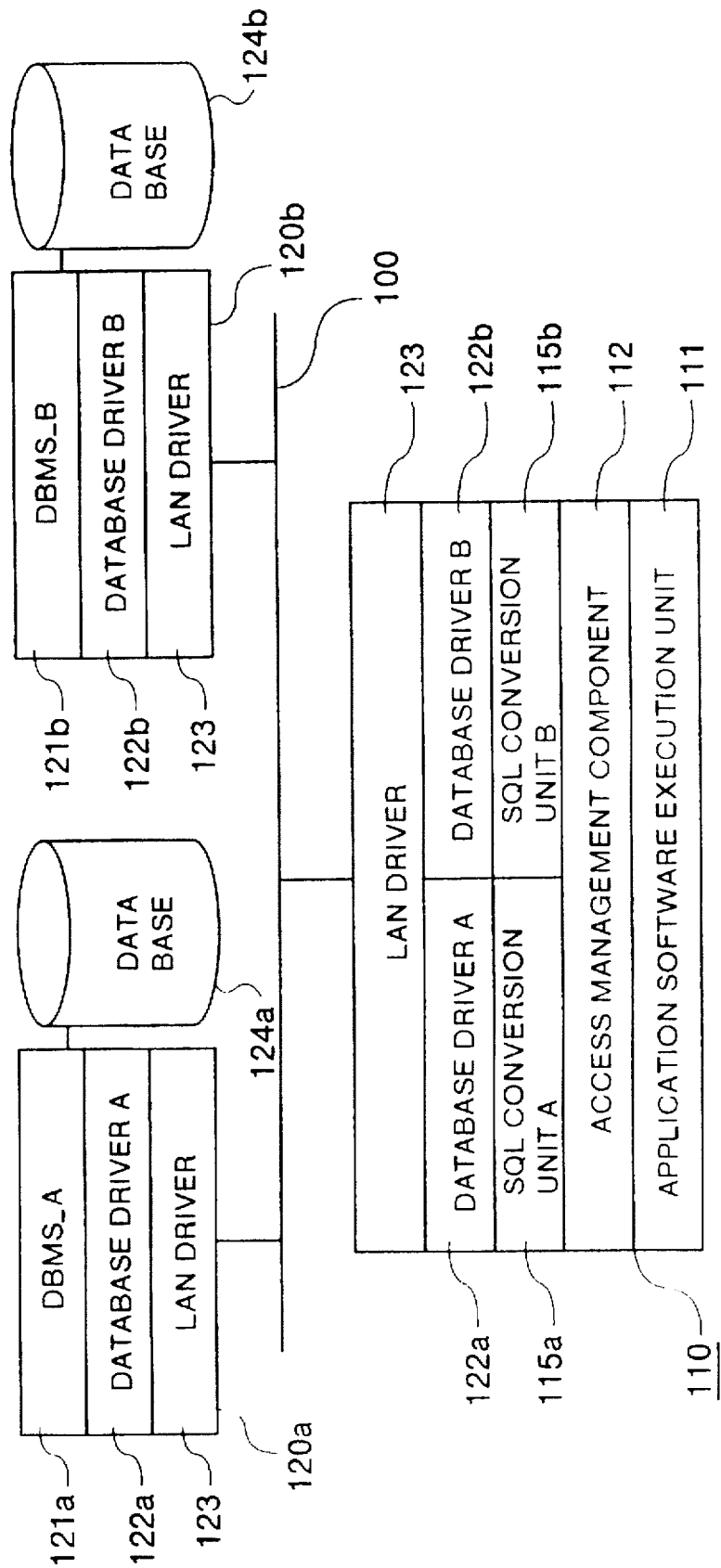
FIG. 2 is a diagram showing a configuration example of a conventional database access system.
Figure 3:
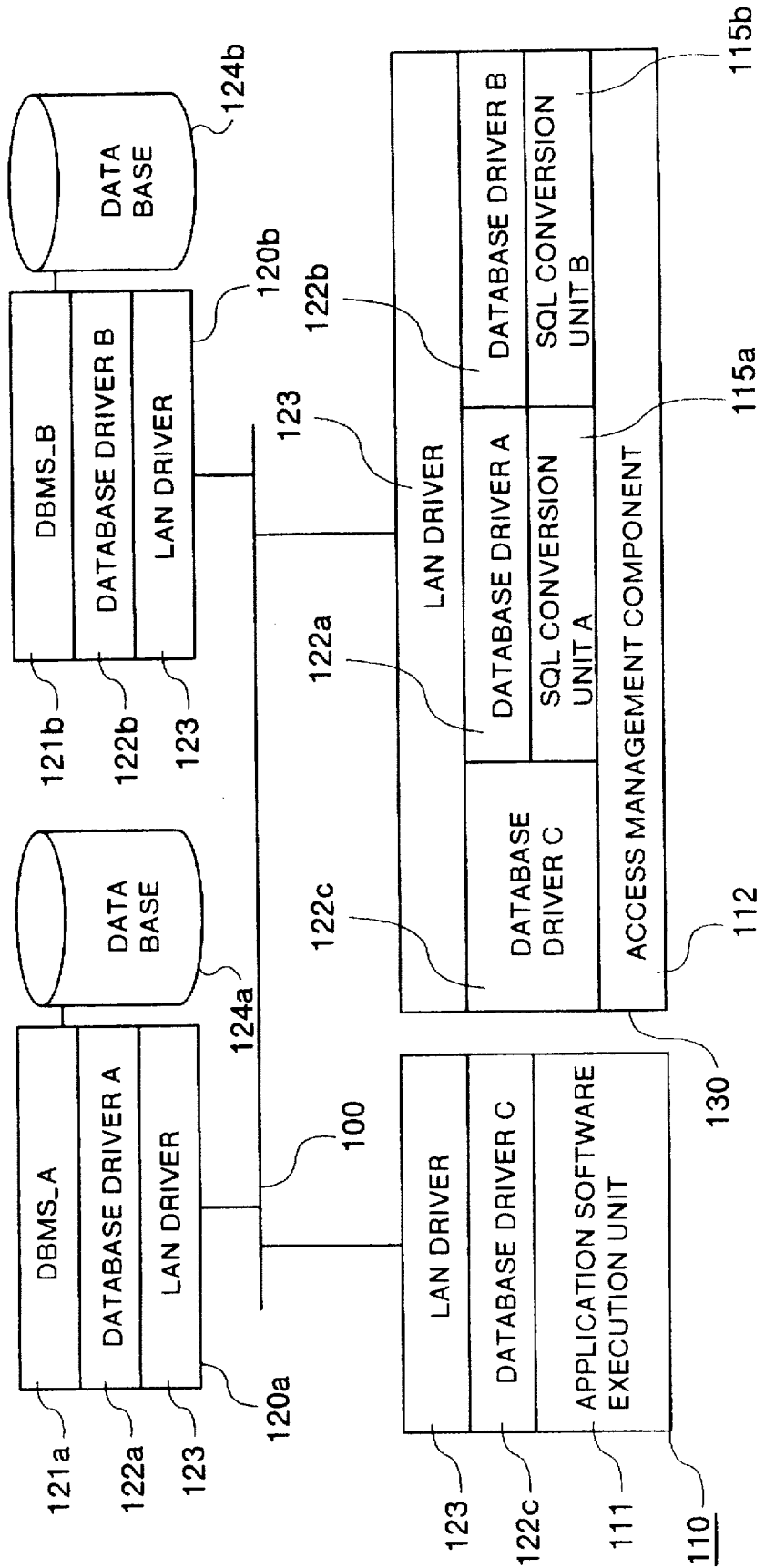
FIG. 3 is a diagram showing another configuration example of a conventional database access system.
Figure 39:
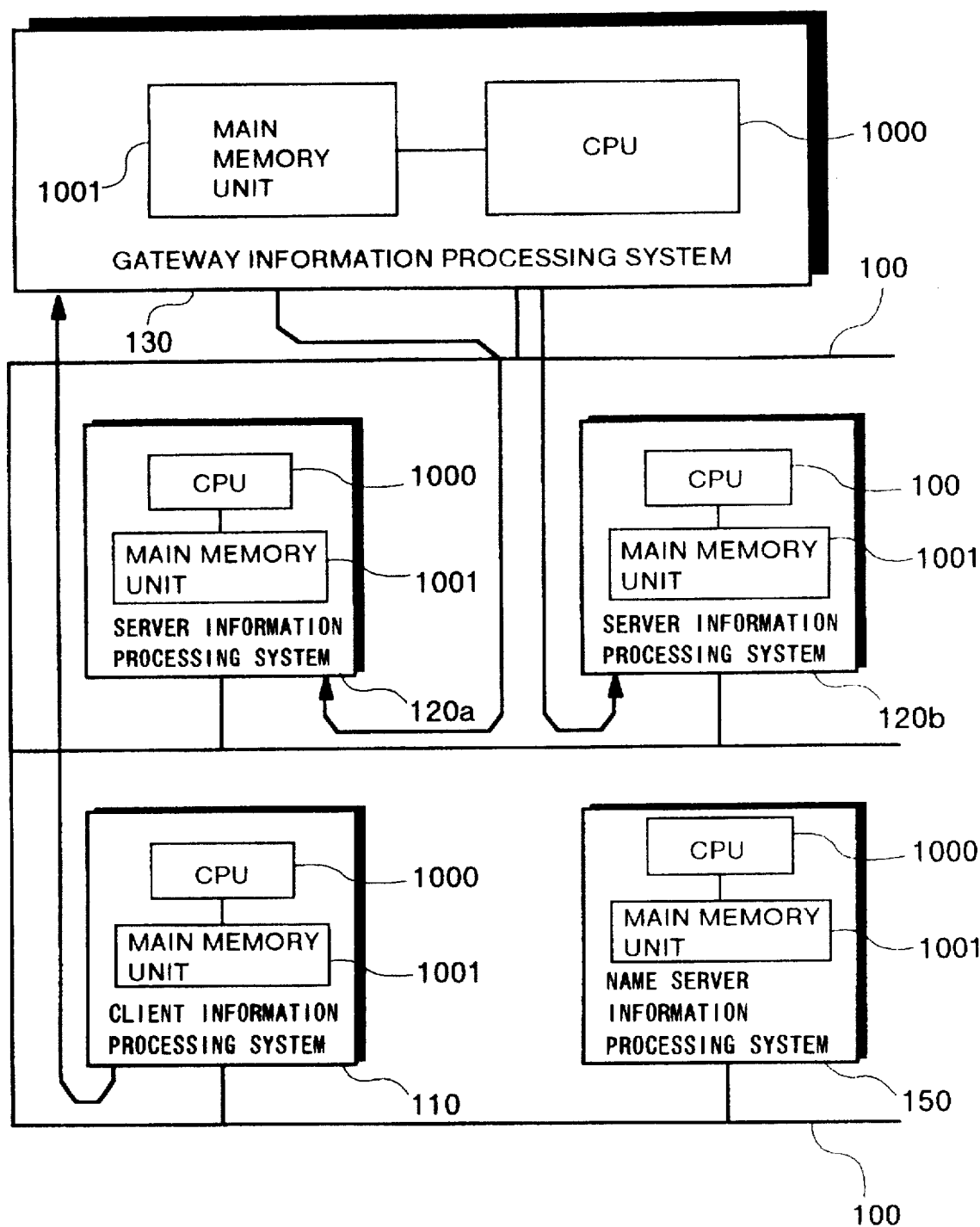
FIG. 39 is a diagram showing the hardware configuration of a database access system according to the first embodiment.

An example configuration of a heterogeneous database access system according to the first embodiment is shown in FIG. 1. The heterogeneous database access system according to the first embodiment comprises a client information processing system 110, a gateway information processing system 130, server information processing systems 120a, 120b and a name server information processing system 150. The information processing systems 110, 120a, 120b, 130, 150 are connected by the LAN 100. As shown in FIG. 39, each of the information processing systems 110, 120a, 120b, 130, 150 includes at least a main memory unit 1001 and a central processing unit (CPU) 1000.

The client information processing system 110 includes an application software execution unit 111, an RPC driver 102 and a LAN driver 123. This information processing system has the application software execution unit 111 issue a remote procedure call (RPC) providing a request for accessing the data held in the data base and receives the response to the request. The application software execution unit 111, the RPC drive 102 and the LAN driver 123 are implemented by the CPU 1000 of the client information processing system 110 executing the instruction held on the main memory unit 100 of the client information system 110.

The server information processing system 120a includes a DBMS_A 121a, a database driver A 122a and a LAN driver 123. The server information processing system 120b includes a DBMS_B 121b, a database driver B 122b, and a LAN driver 123. The server information processing systems 120a, 120b have the DBMS_A 121a, DBMS_B 121b respond to the database access received. The DBMS_A 121a, the database driver A 122a and the LAN driver 123 of the server information processing system 120a are implemented by the CPU 1000 thereof executing the instruction held on the main memory unit 1001 of the server information processing system 120a. The DBMS_B 121b, the database driver B 122b and the LAN driver 123 of the server information processing system 120b are implemented by the CPU 1000 of the server information processing system 120b executing the instruction held on the main memory unit 1001 of the server information processing system 120b.

The name server information processing system 150 includes a name server 151, an RPC driver 102 and a LAN driver 123. This information processing system is such that the name server 151 is operated to provide the service of supplying the information for identifying each server component (including the access management component 112v and the SQL conversion unit 115) accessed by the RPC and the information corresponding to the physical position on the network. The name server 151, the RPC driver 102 and the LAN driver 123 of the name server information processing system 150 are implemented by the CPU 1000 of the name server information processing system 150 executing the instruction held on the main memory unit 1001 of the name server information processing system 150.

The gateway information processing system 130 includes an access management component 112v, two types of database access language conversion means (which are called SQL conversion unit here as the SQL is used as a database access language and include the SQL conversion unit A 115a and the SQL conversion unit B 115b according to this embodiment), database drivers (the database driver A 122a and the database driver B 122b), an RPC driver 102 and a LAN driver 123. This gateway information processing system is for processing the RPC. The access management component 112v, SQL conversion unit A 115a, SQL conversion unit B 115b, a database driver A 122a, a database driver B 122b, an RPC driver 102 and a LAN driver 123 of the gateway information processing system 130 are implemented by the CPU 1000 of the gateway information processing system 130 executing the instruction held on the main memory unit 1001 of the gateway information processing system 130.

The access management component 112v and the RPC driver 102 of the gateway information processing system 130 are collectively called an access management means.

The data in the data base managed by the DBMS_A 121a and DBMS_B 121b, as in the prior art, are stored in an external memory unit which is not shown for simplicity.

[Processing of SQL_RPC]

The database access from the application software execution unit 111 is carried out by executing the RPC (the RPC designated for the SQL statement as a parameter, hereinafter called SQL_RPC) corresponding to the SQL statement issued by the application software execution unit 111.

The SQL specification used by the application software execution unit 111 will be called the standard specification for the system of the first embodiment. According to the first embodiment, the DBMS_A 121a and DBMS_B 121b use a SQL specification different from the standard specification.

Upon issuance of the SQL_RPC from the application software execution unit 111, the RPC driver 102 on the client information processing system 110 first inquires the name server 151 on the name server information processing system 150 of the port number for connection to the server component and the network address of the server for processing the SQL.

According to the first embodiment, the server that processes the SQL_RPC is an access management component 112v on the gateway information processing system 130. In response to this enquiry, therefore, the name server 151 returns the network address information of the gateway information processing system 130 and the port number of the access management component 112v.

On the basis of these information, the RPC driver 102 on the client information processing system 110 establishes connection with the access management component 112v on the gateway information processing system 130 by RPC, and requests the access management component 112v to process the SQL_RPC of interest.

The access management component 112v notifies the name of the target DBMS included in the SQL_RPC the processing of which has been requested to the name server 151 and thus enquires the name server of the SQL conversion component to be used. According to the first embodiment, the name server 151 responds with the port number and the network address information of the SQL conversion unit A 115a or the SQL conversion unit B 115b. The access management component 112v, therefore, on the basis of the information replied from the name server 151, requests a SQL conversion unit determined by the particular information to convert the SQL statement and make access to the target DBMS using the RPC.

The result of the access made to the DBMS by the SQL conversion unit A 115a or the SQL conversion unit B 115b is converted into the standard data format and the standard return code by the SQL conversion unit A 115a or the SQL conversion unit B 115b and sent in the reverse direction of the route to the application software execution unit 111 through the access management component 112v.

The processing of SQL_RPC mentioned above is shown in the flowchart of FIG. 4.

[Processing of RPC driver 102]

When the SQL_RPC is issued by the application software 111 of the client information processing system 110, the RPC driver 102 of the client information processing system 110 first inquires the name server 151 on the name server information processing system 150 of the physical position of the server for processing the SQL_RPC, i.e., the network address and the port number of the server component (step 450). The RPC driver 102 then establishes connection with the access management component 112v on the gateway information processing system 130 by RPC using the port number thus obtained, and requests the same access management component 112v to process the SQL_RPC (step 451).

[Processing of name server 151]

The name server information processing system. 150 according to this embodiment includes a server information table for holding the identification information and addresses of the server components. An example of the server information table according to the first embodiment is shown in FIG. 35. The server information table has such a structural arrangement as to include an address storage region (column 1702), a port number storage region (column 1703) and a status storage region (column 1704) with a corresponding server component name storage region (column 1701). The status storage region (column 1704) holds the status of each component, where the server in operation is labeled as "RUN", the server in stationary state as "STOP", and the server in fault as "FAULT".

The name server 151 that has received an enquiry of the physical position of the server at step 450 or the like described above, with reference to the server information table, replies with the port number and the network address of the server component held in correspondence with the name enquired, if the value held in the status storage region is "RUN".

[Processing of access management component 112v]

Steps 401 to 411 are concerned with the processing of the access management component 112v that has received a request. The access management component 112v that has received a request at step 451 first analyzes the SQL statement that has been sent as a SQL_RPC parameter, and obtains the name of the DBMS containing the table of the access destination (step 401).

According to this embodiment, the access management component 112v is capable of performing the operation not only on the table of a single DBMS but such operations as search and combination of data on a plurality of tables covering a plurality of data bases managed by different DBMSs. In view of this, the access management component 112v according to the first embodiment decides whether the access destination includes both DBMS_A 121a and DBMS_B 121b (step 402) or only DBMS_A 121a (step 403) or only DBMS_B 121b (step 404).

In the case where the access destination includes both DBMS_A 121a and DBMS_B 121b, the access management component 112v prepares the SQL statement by dividing the SQL statement involved into the access to DBMS_A 121a and that to DBMS_B 121b (step 406). Next, the access management component 112v executes the RPC (called the SQL_A_RPC) with the SQL statement for DBMS_A 121a as a parameter and obtains the result thereof (step 407). Further, the RPC (called SQL_B_RPC) with the SQL statement for DBMS_B 121b as a parameter is executed, and the result is obtained (step 403). Finally, the access management component 112v merges the results obtained at steps 407 and 408 and prepares the result corresponding to the SQL statement before division (step 409), thereby completing the processing of SQL_RPC (step 412).

In the case where the access destination is only DBMS_A 121a, the access management component 112v issues the RPC (SQL_A_RPC) with the SQL statement involved as a parameter and obtains the result (step 410), thus completing the processing of the SQL_RPC (step 412).

In the case where the access destination is only DBMS_B 121b, on the other hand, the access management component 112v issues the RPC (SQL_B_RPC) with the SQL statement involved as a parameter and obtains the access result (step 411), thereby completing the processing of SQL_RPC (step 412).

In the case where the access destination is neither DBMS_A 121a nor DBMS_B 121b, the access management component 112v sets the error code (step 405) and completes the processing of SQL_RPC (step 412).

[Division of SQL_RPC (step 406)]

When the access management component 112v, upon detection that the SQL statement to be processed contains a processing instruction for a plurality of data bases, prepares a SQL_RPC divided for each access destination (step 406). The SQL statement prepared by the access management component 112v will be explained with reference to the example of the select syntax shown in FIG. 23. The select syntax is the one for designating a question in which the record satisfying the condition designated by the WHERE phrase is searched for from the access destination described in the FROM phrase for designating a question to obtain a table with the data designated by the SELECT phrase of the record as a component element.

The SQL statement 2301 issued by the application software execution unit 111 is for searching the table called "SALES" managed by the database management system in the name of "DBMS_A" and the table called "SALES-DATA" managed by the database management system in the name of "DBMS_B" for the record with the content of the "SaleNum" column not zero, and thus designating the preparation of a table having the contents of the "Name" column and the "SaleNum" column of the particular record.

The access management component 112v divides the SQL statement 2301 into the SQL statement 2302 for DBMS_A and the SQL statement 2303 for DBMS_B, issues an RPC with each SQL statement as a parameter, and prepares a table providing a response to the SQL statement 2301 by combining the responses to the respective statements.

The SQL statement 2302 means that a table called "SALES" managed by the database management system in the name of "DBMS_A" is searched for a record with the content of the "SaleNum" column not zero to prepare a table including the contents of the "Name" column and the "SaleNum" column of the particular record.

The SQL statement 2303 means that the table called "SALESDATA" managed by the database management system in the name of "DBMS_B" is searched for a record with the content of the "SaleNum" not zero to prepare a table having the contents of the "Name" column and the "SaleNum" column from the particular record.

[SQL_RPC processing for designating access to single DBMS (steps 407, 410 for SQL_A_RPC processing and steps 408, 411 for SQL_B_RPC processing)]

Figure 5:
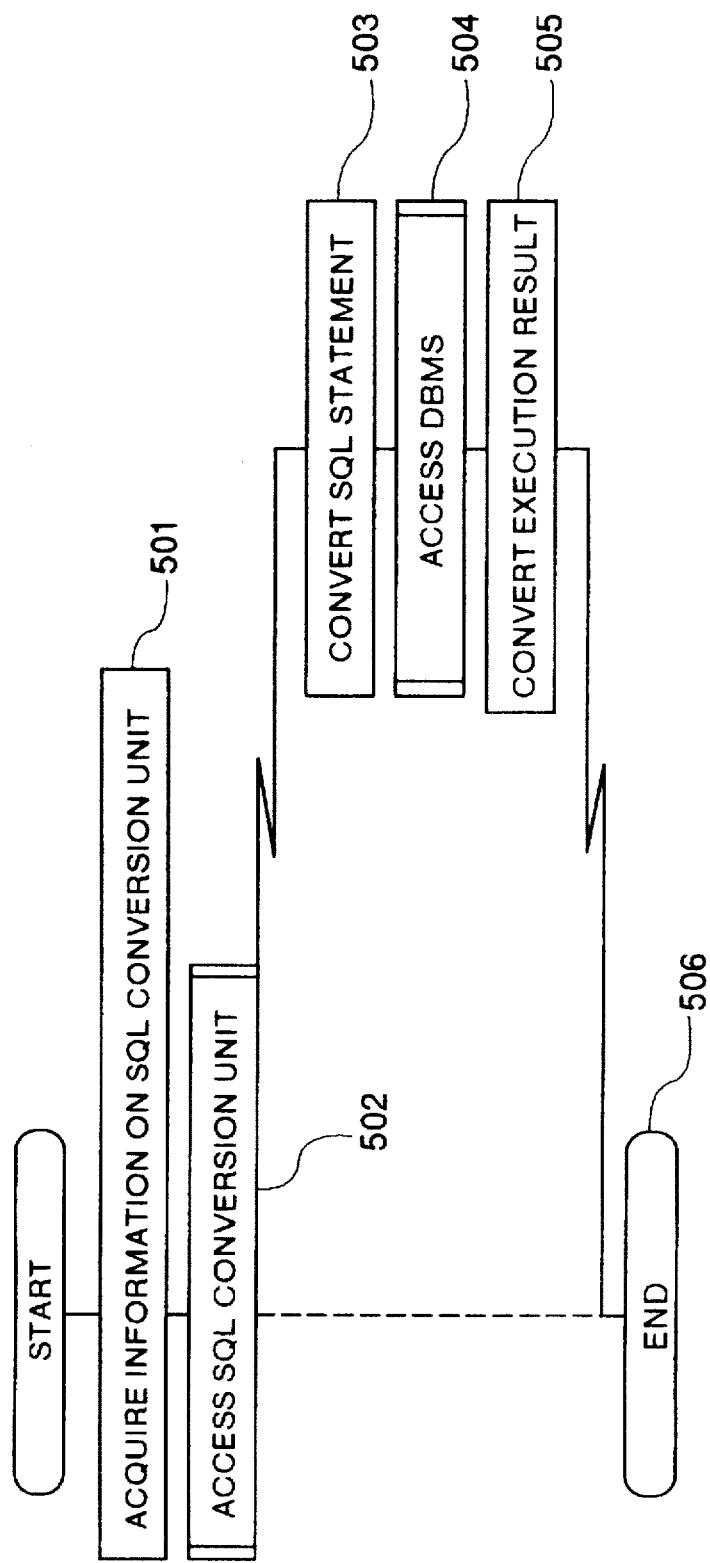
FIG. 5 is a flowchart showing the processing for the RPC issued to SQL conversion unit from an access management component according to the first embodiment.

The SQL_RPC (hereinafter called the SQL_x_RPC) processing for designating the access to a single DBMS is shown in FIG. 5. In the SQL_x_RPC processing, first, the driver 102 of the gateway information processing system 130 acquires from the name server 151 the port number and the network address information of the server component (the SQL conversion unit A 115a or the SQL conversion unit B 115b according to the first embodiment) for processing the SQL_x_RPC (step 501).

Next, the RPC driver 102 of the gateway information processing system 130 delivers the SQL_x_RPC to the SQL conversion unit 115 detected by the enquiry at step 501 requests it to process the SQL_x_RPC (step 502).

According to the first embodiment, the RPC driver 102 that made an enquiry at step 501 and the SQL conversion unit A 115a and the SQL conversion unit B 115b are all present in the same gateway information processing system 130. The RPC driver 102, therefore, can notify the SQL_x_RPC to the SQL conversion unit 115 without using the network address information or the port number. The processing of step 501 can thus be done without in the first embodiment.

Steps 503, 504, 505 are the requested process of the SQL conversion unit 115. The SQL conversion unit 115 converts the SQL statement of standard specification received as an RPC parameter into the SQL specification of a target DBMS (step 503). Next, the SQL conversion unit 115 sends the SQL statement prepared by conversion to the target DBMS and obtains the result of execution of the SQL statement at the target DBMS (step 504). Further, the SQL conversion unit 115 converts the data and the return code obtained as a result of execution to the standard SQL specification from the SQL specification of the target DBMS (step 505). Finally, the SQL conversion unit 115 completes the processing of SQL_x_RPC with the conversion result as a return data and return code (step 506).

Then, the conversion of the SQL statement by the SQL conversion unit 115a, 115b (step 503) will be explained with reference to the example shown in FIG. 24. The SQL conversion unit 115a, 115b convert the input SQL syntax into the SQL specification of the target DBMS respectively. Step 505 performs the reverse conversion.

In the SQL of standard specification according to this first embodiment, the operator indicating "unequal" is "< >". The SQL specification of DBMS_A 121a, however, is assumed to use "! =", and that of DBMS_B 121b assumed to use "¬ =" in that place. In this case, the SQL conversion unit A 115a converts the SQL statement 2302 of standard specification (shown in FIG. 23) to the statement as shown in the syntax 2402 in FIG. 24. More specifically, the SQL conversion unit A 115a converts the "< >" of the syntax 2302 into "! =". Also, the SQL conversion unit B 115b converts the SQL statement 2303 of standard specification (shown in FIG. 23) to the statement as shown in the syntax 2403 in FIG. 24. In other words, the SQL conversion unit B 115b converts the "< >" of the syntax 2302 into "¬ =".

As explained above, the provision of the access management component 112v, the SQL conversion unit A 115a and the SQL conversion unit B 115b permits the application software execution unit 111 to access the tables on a plurality of DBMSs of different specifications by using only the SQL statement of standard specification without being conscious of the specification differences among the DBMSs.

[Process creation and termination in gateway information processing system 130]

Figure 10:
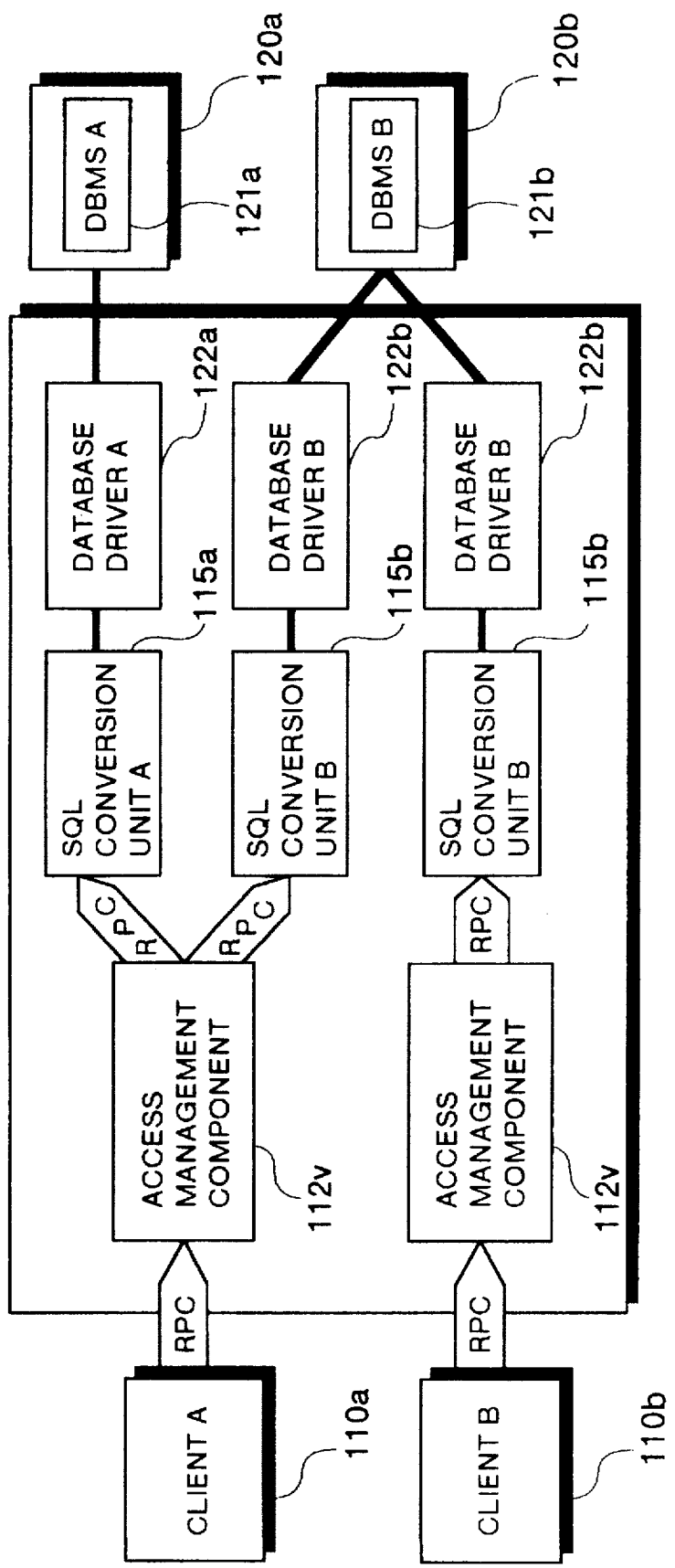
FIG. 10 is a diagram for explaining the operation of a gateway information processing system 130 according to the first embodiment.

An example of program operation in the gateway information processing system 130 according to the first embodiment is shown in FIG. 10. In the shown case, two units of client information processing systems are connected, so that the client information processing system 110a are assumed to access the DBMS_A on the server information processing system 120a and the DBMS_B on the server information processing system 120b, and the client information processing system 110b to access the DBMS_B on the server information processing system 120b.

The access management component 112v creates individual processes for each client information processing system. A process is created each time the access request from each process of the access management component 112v is issued to each of the SQL conversion unit A 115a and the SQL conversion unit B 115b by use of RPC. Also, the process for the database driver A 122a and the database driver B 122b is created one each for the SQL conversion unit A 115a and the SQL conversion unit B 115b.

These processes are terminated with the end of access. The process creation and termination performed by the gateway information processing system 130 makes possible the processing of simultaneous access to a plurality of server information processing systems from a plurality of client information processing systems.

Figure 18:
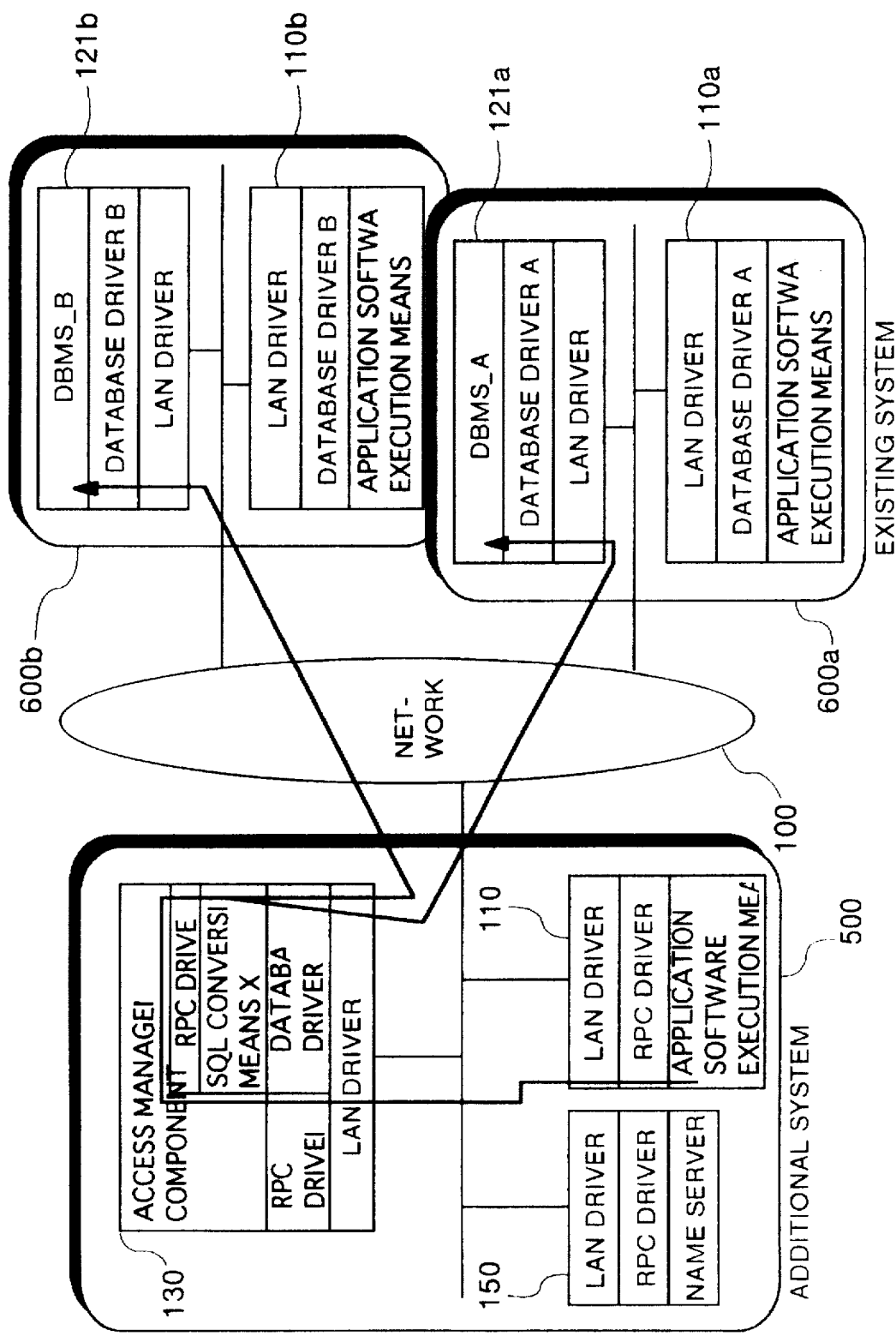
FIG. 18 is a diagram showing another configuration of the system according to the first embodiment.

The heterogeneous database access system according to the first embodiment as applied to a network 100 comprising two existing systems 600a and 600b including database management systems of different specifications will be explained with reference to FIG. 18.

The system 600a includes a server information processing system 121a using DBMS_A, a database driver A dedicated to DBMS_A and a client information processing system 110a having the application software A execution unit. The system 600b, on the other hand, includes a server information processing system using DBMS_B, a database driver B dedicated to DBMS_B, and a client information processing system 110b having the application software B execution unit.

An additional system 500 including the gateway information system 130, the name server information processing system 150 and the client information processing system 110a described above is added to these existing systems. In this way, a plurality of DBMSs of different specifications can be accessed using a single SQL statement of standard specification without changing the configuration of the existing systems 600a, 600b.

According to this invention, an RPC is used for access to the access management component 112v from the application software execution unit 111 and access to the SQL conversion unit 115 from the access management component 112v. As a result, the reduced database access performance which is caused by load concentration on the gateway information processing system 130 in the heterogeneous database access system according to the first embodiment can be avoided easily by adding the gateway information processing system 130. Explanation will be made about a second embodiment with the gateway information processing system 130 added.

Figure 9:
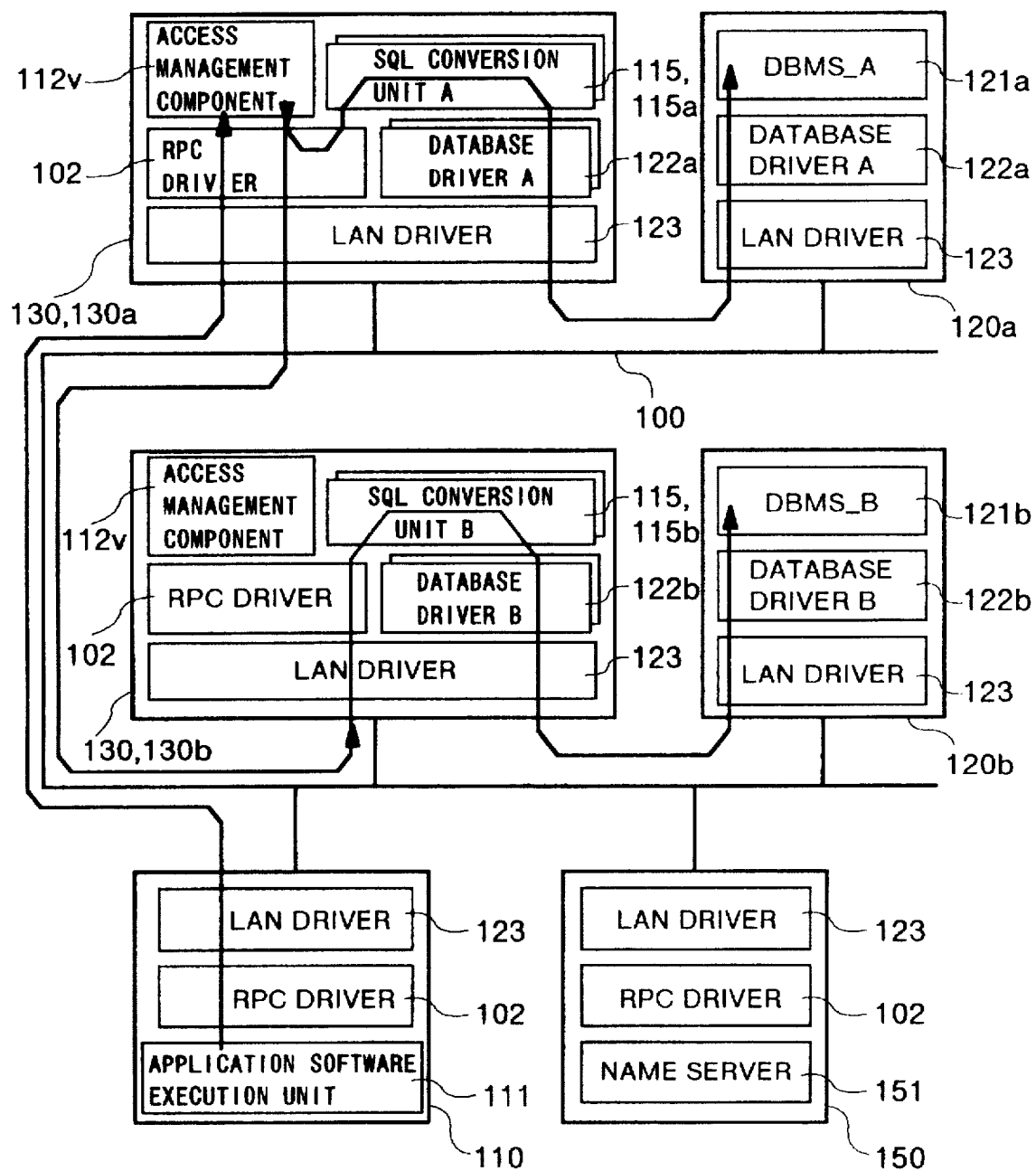
FIG. 9 is a diagram showing the configuration of a database access system according to a second embodiment.

According to the second embodiment, as shown in the configuration diagram of FIG. 9, two gateway information processing systems including the gateway information processing system 130a having a SQL conversion unit A 115a and the gateway information processing system 130b having a SQL conversion unit B 115b are connected to a network 100. More specifically, the second embodiment is different from the first embodiment in that the second embodiment comprises the gateway information processing system 130 for each SQL conversion unit 115.

The RPC driver 102 on the client information processing system 110, as in the first embodiment, upon receipt of the SQL_RPC issued by the application software execution unit 111, first inquires the name server 151 of the port number and the network address, i.e., the physical position of the server for processing the SQL_RPC.

Figures 16, 17:
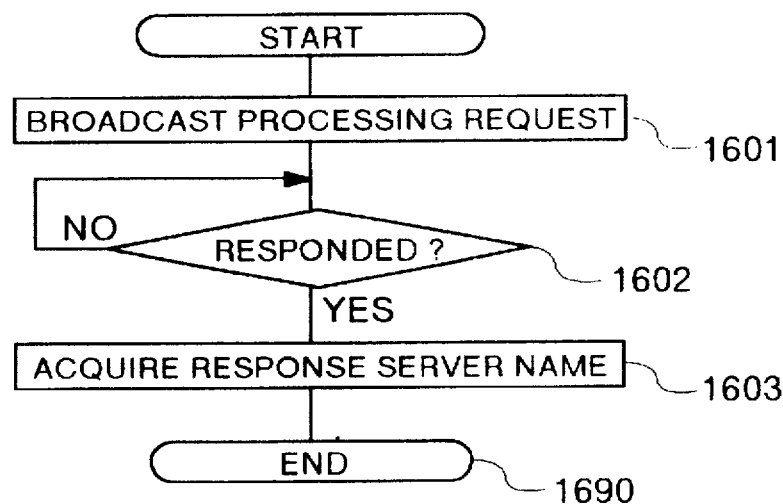
FIG. 16 is a flowchart showing the process for selecting a server component using a broadcast RPC according to the second embodiment.
FIG. 17 is a diagram for explaining an example of the server information table according to the second embodiment.

The server information table according to the second embodiment, as shown in FIG. 17, has stored therein a plurality of server information (address, port number and the status of each component) corresponding to each server component name. In other words, "RUN", "STOP" and "FAULT" are stored for the server in operation, the server in stationary state and the server in fault, respectively. The name server 151 according to the second embodiment responds with the port number and the network address of all the server components in operation corresponding to the designated server component name with reference to the server information table 1700. More specifically, the name server 151 responds with the data (port number) held in column 1703 and the data (network address) held in column 1702 for all the rows where the designated server component name is held in column 1701 and "RUN" is held in column 1704.

According to the second embodiment, the server for processing the SQL_RPC, i.e., the access management component 112v is included in both the gateway information processing systems 130a, 130b, and the name server 151 replies the physical position of two access management components 112v in response to the above-mentioned enquiry. The RPC driver 102 on the client information processing system 110, as first selection means, selects one of a plurality of access management components 112v included in the reply and request the processing thereof.

The processing of each component element of the heterogeneous database access system according to the second embodiment, except for those specifically described here, is similar to that for the first embodiment.

[Example of operation]

Next, explanation will be made about the operation for the case in which the access management component 112v on the gateway information processing system 130a is selected.

The SQL_RPC issued from the application software execution unit 111 is first sent to the access management component 112v on the gateway information processing system 130a by the RPC driver 102 of the client information processing system 110.

Figure 4:
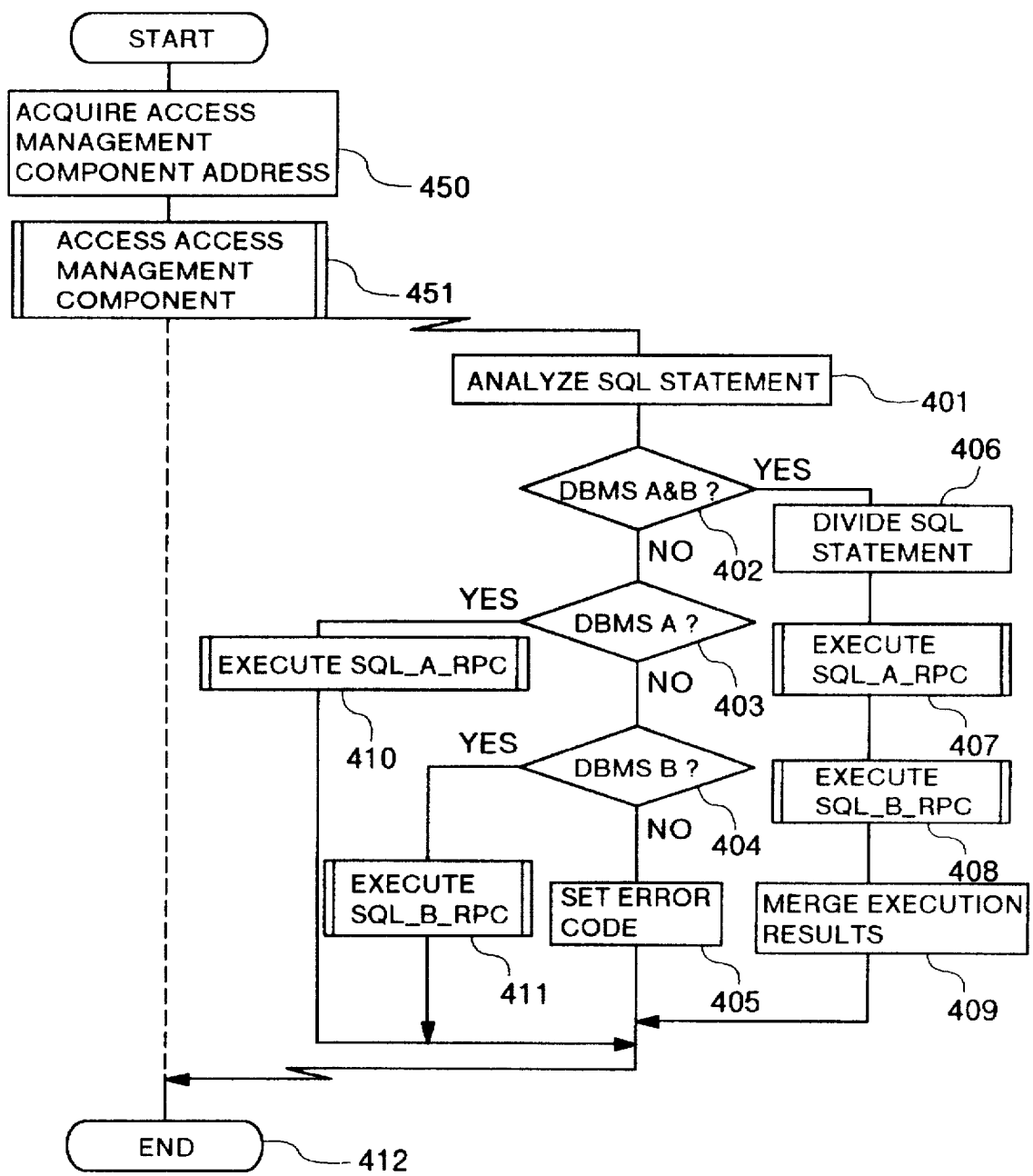
FIG. 4 is a flowchart showing the processing for the RPC issued to an access management component from a client information processing system according to the first embodiment.

The access management component 112v of the gateway information processing system 130a, as already described with reference to FIG. 4, issues the SQL_A_RPC and/or the SQL_B_RPC in accordance with the target DBMS of the SQL_RPC received. Then, the access management component 112a, if the SQL_x_RPC issued is the SQL_A_RPC, notifies the SQL conversion unit A 115a for appropriate processing, while if the SQL_x_RPC issued is the SQL_B_RPC, on the other hand, the SQL conversion unit B 115b is notified for appropriate processing.

In the system according to the second embodiment, the SQL conversion unit B 115b for processing the SQL_B_RPC is present in the gateway information processing system 130b different from the gateway information processing system 130a having the access management component 112a requested for processing. As a result, the RPC driver 102 of the gateway information processing system 130a notifies the SQL_B_RPC to the SQL conversion unit B 115b on the gateway information processing system 130b through the LAN 100. In a system comprising a plurality of SQL conversion unit B 115b, the RPC driver 102 of the gateway information processing system 130a may be adapted to select the SQL conversion unit B 115b notified by the same procedure as for the RPC driver 102 of the client information processing system 110 described above.

In this way, according to the second embodiment, the SQL conversion unit 115 is accessed by using the RPC, and the RPC driver 102 on the gateway information processing system 130 selects the SQL conversion unit 115 requested for processing. Even in the case where the SQL conversion unit 115 is distributed on a plurality of gateway information processing systems 130, therefore, the application software execution unit 111 can access without being conscious of the position thereof. As a result, it is sufficient if the SQL conversion unit 115 corresponding to the various DBMSs in the system are present in any gateway information processing system 130 in the system. Each gateway information processing system 130 is not required to have all the SQL conversion unit 115. Thus, the load concentration on each gateway information processing system 130 is avoided, and the introduction of the SQL conversion unit 115 and the number of maintenance processes can be reduced at the same time.

[Method of selection]

The RPC driver 102 on the client information processing system 110 executes the selection of the access management component 112v and notifies the SQL_RPC. Also, the RPC driver 102 on the gateway information processing systems 130a, 130b executes the selection of the SQL conversion unit A 115a and the SQL conversion unit B 115b, and notifies the SQL_x_RPC. Explanation will be made about an example of the method of selecting the destination of notification by the RPC driver 102 when a plurality of candidates are replied from the name server 151 as a result of inquiry of the name server 151.

[Random selection]

Figure 12:
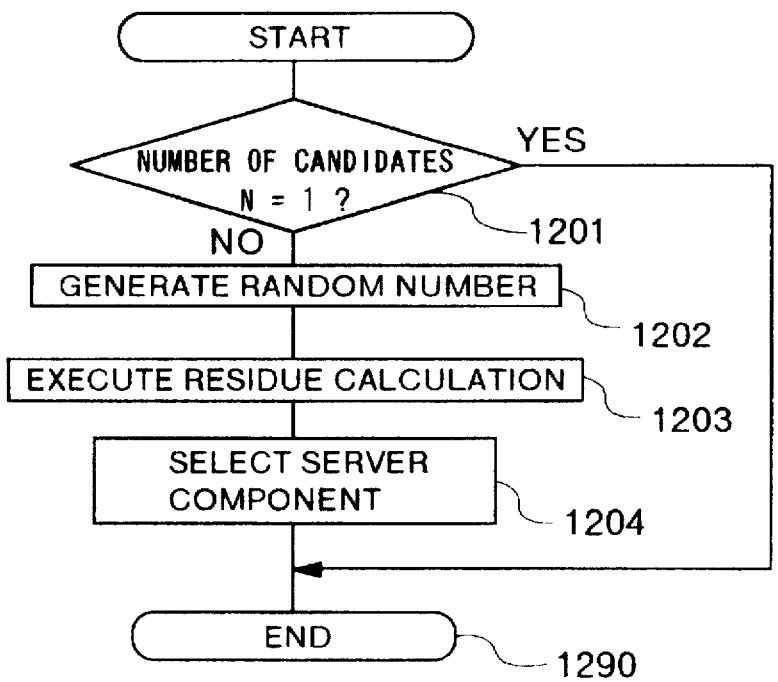
FIG. 12 is a flowchart showing the process for selecting a server component using a random number.

The first method of selection is for selecting from a plurality of candidates randomly. As shown in FIG. 12, in the case where there are two or more candidates (step 1201), a method may be employed in which a random number is generated (step 1202), the random number is divided by the number N of candidates to determine the remainder (step 1203), and the candidate in the number of the remainder plus one is selected as a server component (step 1204).

[Selection by order of priority]

The second method of selection uses the order of priority registered in advance. In this method, the order of priority of the server components is stored in advance in in a file accessible by the RPC driver 102 in the table format as shown in FIG. 13, and the RPC driver 102 selects a server component of high priority from among a plurality of candidates given as a response from the name server 151.

Figure 13:
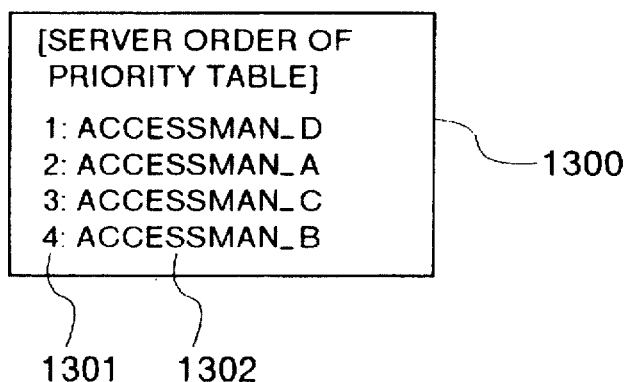
FIG. 13 is a diagram showing an example of the contents of the priority order table prepared for selecting a server component according to the second embodiment.

The column 1301 in FIG. 13 designates the order of priority, and the column 1302 the storage area for server names. When this method is used, in the case where a server component exists on the same information processing system as the component issuing the RPC, the particular server component is set to a high order of priority. Then the overhead which might occur through the network can be reduced.

[Selection by load condition]

Figure 14:
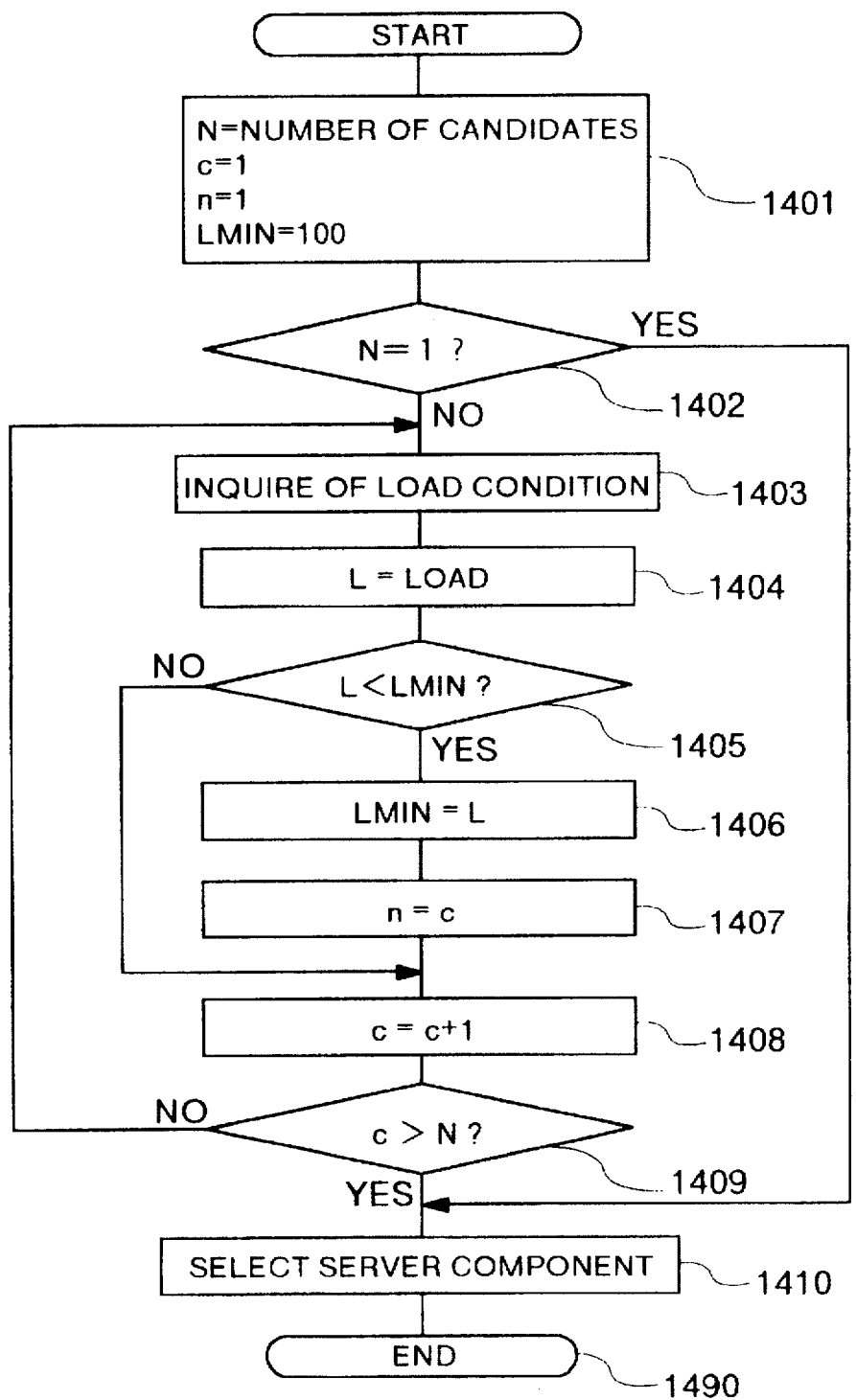
FIG. 14 is a flowchart showing the process for selecting a server component according to the load condition in the second embodiment.

The third method uses the load condition of each gateway server information processing system 130 for selection. The load condition is defined, for example, as the CPU occupancy rate of the instructions of all the programs in operation at the gateway server information processing system 130 and the frequency of access to an external memory unit. When this method is used, each gateway server information processing system 130 includes a load information notification means (not shown) for responding with the load condition of the CPU and the external memory unit supplied by the operating system (OS) of each gateway server in response to an enquiry. Also, the storage area (not shown) of each RPC driver 102 includes an area for storing the number (N) of candidates of the server components (the access management component 112v or the SQL conversion unit 115), a storage area for the counter variables (c), a storage area for the minimum load server number storage variable (n), a storage area for the minimum load storage variable (LMIN) and a variable indicating the load condition (L). The procedure for selection process according to the third method is shown in FIG. 14. The load information notification means is realized by the CPU of the gateway server information processing system 130 executing the instruction held in the main memory unit 1001 of the gateway server information processing system 130.

The RPC driver 102 initializes the server component candidate number (N) storage area, the counter variable (c) storage area, the minimum load server number memory variable (n) storage area and the minimum load memory variable (LMIN) storage area (step 1401). Initialization at step 1401 is to store the initial value in each storage area. According to this second embodiment, the initial value of the number (N) of the server component candidates is the one notified, the initial value of the counter variable (c) and the minimum load server number memory variable (n) is 1, and that of the minimum load memory variable LMIN is 100.

Now, the RPC driver 102 checks to see whether the server component candidates are in a plural number. If only one candidate is involved, there is no need to check the load, and therefore the process is passed to step 1410, where the result of selection is used as a server component cited as a candidate (step 1402).

In the case where there are a plurality of server component candidates, the RPC driver inquires load information notification means of the gateway server information processing system 130 including the cth candidate server component of the load information (step 1403), and stores the numeric value indicating the load condition returned from the server component in the variable L storage area (step 1404). The numeric value indicating the load condition is given as a numeric value (percentage) from 0 to 100. The greater the number of the programs in parallel execution at the gateway server information processing system 130, for example, the larger the numeric value. In contrast, in the case where there is no program in execution, a value in the vicinity of zero is assumed.

The RPC driver 102 compares the minimum value LMIN of the load of other servers thus far checked with the variable L (step 1405), stores the value L in LMIN when the variable L is smaller (step 1406), and stores the value c that is the candidate number of the server component checked above as the minimum load server number n. (step 1407). After that, the RPC driver 102 increments the value of the counter variable c by one (step 1408), checks to see whether the load check has been completed up to the last candidate (step 1409), and if not yet complete, repeats steps 1403 to 1409.

In this way, the candidate number n of the server component providing the minimum load is held in the storage area n, and therefore the RPC driver 102 completes the process by selecting the server component indicated by the candidate number held in the storage area n (step 1410).

According to this method, a server component on the information processing system with a small load can be selected, and therefore load concentration on a single information processing system can be avoided, thus permitting a high-speed processing. In this case, the enquiry at step 1403 is made for each candidate server component. In this way, a server component to be used can be determined in accordance with the load condition of each server component but not in accordance with the information processing system as a whole.

[Selection by response time]

Figure 15:
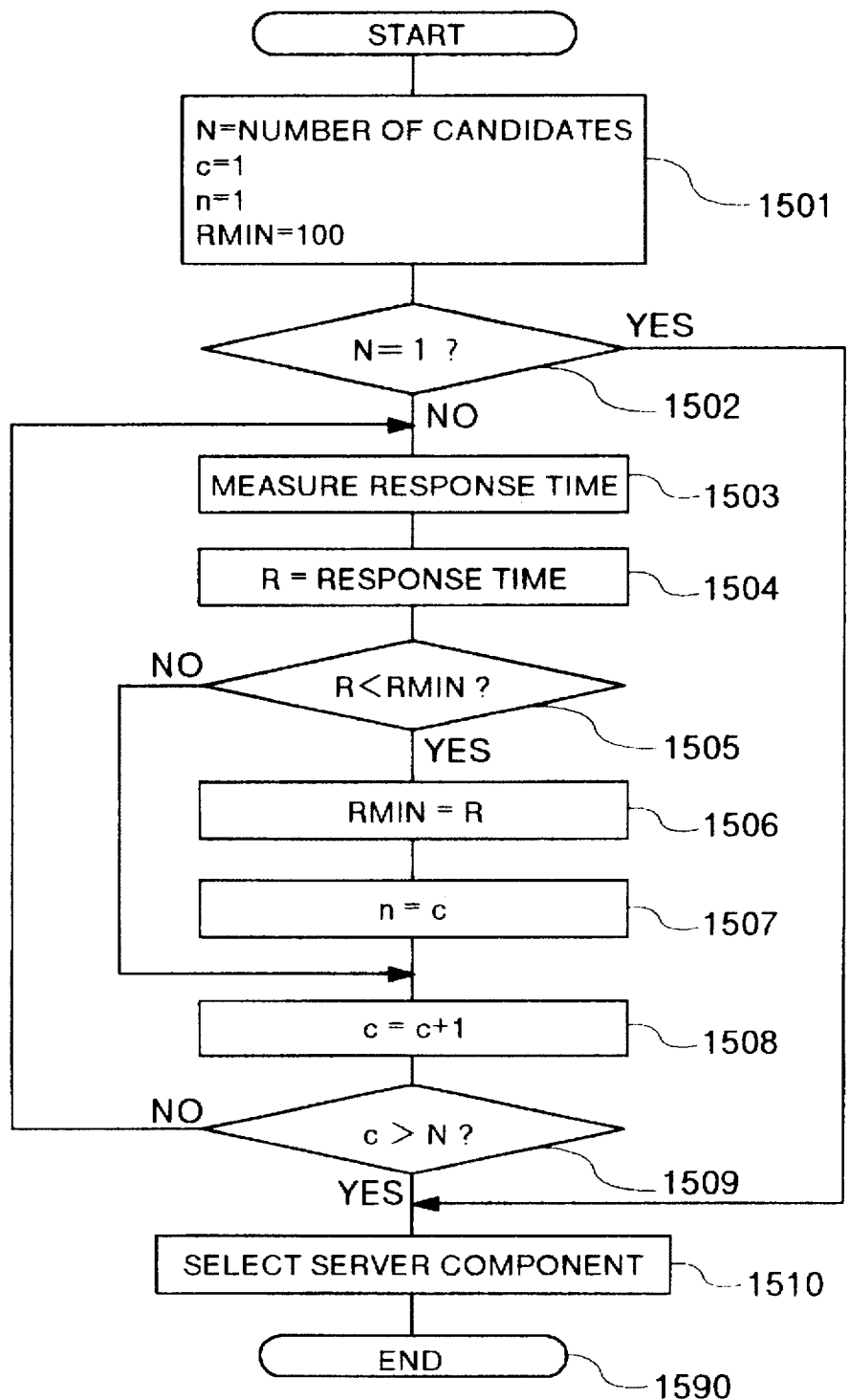
FIG. 15 is a flowchart showing the process for selecting a server component according to the response time in the second embodiment.

The fourth method of selection is based on the response time from each gateway server information processing system 130. When this method is used, the storage area (not shown) of each RPC driver 101 includes storage areas in the same number (N) as the candidates of the server components (the access management component 112v or the SQL conversion unit 115), a storage area of the counter variables (c), a storage area of the minimum response time server number memory variable (n), a storage area of the minimum response time storage variable (RMIN) and a response time (R) storage area. The procedure for selection according to the fourth method is shown in FIG. 15. The RPC driver 102 initializes the server component candidate number (N) storage area, the counter variable (c) storage area, the minimum response time server number memory variable (n) storage area and the minimum response time memory variable (RMIN) storage area (step 1501). The initialization at step 1501 is storing the initial value in each area. According to the second embodiment under consideration, the initial value of the number N of server component candidates is the notified number of candidates, the initial value of the counter variable c and the minimum load server number memory variable n is 1, and the initial value of the minimum response time memory variable RMIN is 100.

Next, the RPC driver 102 checks whether the server component candidates are plural. If it is only one, the response time need not be checked, and therefore the process proceeds to step 1510 (step 1502).

In the case where there are a plurality of server component candidates, on the other hand, the RPC driver 102 issues a dummy RPC for measuring the response time to the cth server component candidate (step 1503), and stores the response time for this particular RPC in the variable R storage area (step 1504).

Next, the RPC driver 102 compares the minimum value RMIN of the response time of other server components thus far checked with the variable R (step 1505), and if the variable R is smaller, stores the R value in the RMIN (step 1506). After that, the RPC driver 102 stores the candidate number of the server component checked, that is, the value c as the minimum response time server number n (step 1507) and increments the counter variable c by one (step 1508). Further, the RPC driver 102 checks to see whether the response time was checked to the last candidate (step 1509). If the check is not completed to the last candidate, steps 1503 to 1509 are repeated.

Upon completion of checking all the candidates in this way (step 1509), the candidate number of the server component that has been the minimum response time is now held in the n storage area. The RPC driver 102 therefore selects the server component indicated by the candidate number n thereby to complete the processing (step 1510).

The foregoing response time reflects the performance and the load condition of the information processing system including the server component, the distance of the communication route to the information processing system and the degree of traffic congestion of the communication route. An optimum processing can be made therefore by employing the server component having a minimum response time.

[Selection by response time using broadcast communication]

Selection of the server component by response time can be performed more easily by using the broadcast communication than by the fourth method described above. With the broadcast communication, each server component includes means (not shown) for responding to the broadcast RPC calling for a server component that can be processed. The selection procedure according to this method is shown in FIG. 16. The responding means described above is implemented by the CPU executing the instruction held on the main memory unit 1001 of each information processing system including the particular responding means.

First, the RPC driver 102 issues a broadcast RPC calling for a server component that can be processed (step 1601), and waits for a response (step 1602). The response to this broadcast RPC contains information on the responding server component. At the time point of the first response, therefore, the RPC driver 102 acquires from the particular response the server name of the responding server component (step 1603), and employs the particular server component as a server which is requested for actual processing, thereby completing the process (step 1690).

The second and subsequent server components that have responded are ignored. By selecting a server component which is requested of the processing using the broadcast RPC in this way, as in the method of comparing the response time explained above as the fourth method, selection is made possible reflecting the performance and the load condition of the information processing system including the server component, the distance of the communication route to the information processing system and the traffic congestion of the communication route. The broadcast RPC is issued to all the servers connected to the network. A multicast RPC, however, can be issued only to the candidates of server components obtained from the name server 151.

Further, assume that the selection operation by one or both of the methods based on response time is executed a plurality of times and that the server component having the shortest average response time is selected. Then the effect of change in temporary network traffic congestion can be prevented and selection of a most suitable server component is made possible.

[Selection by response time and load condition]

Figure 20:
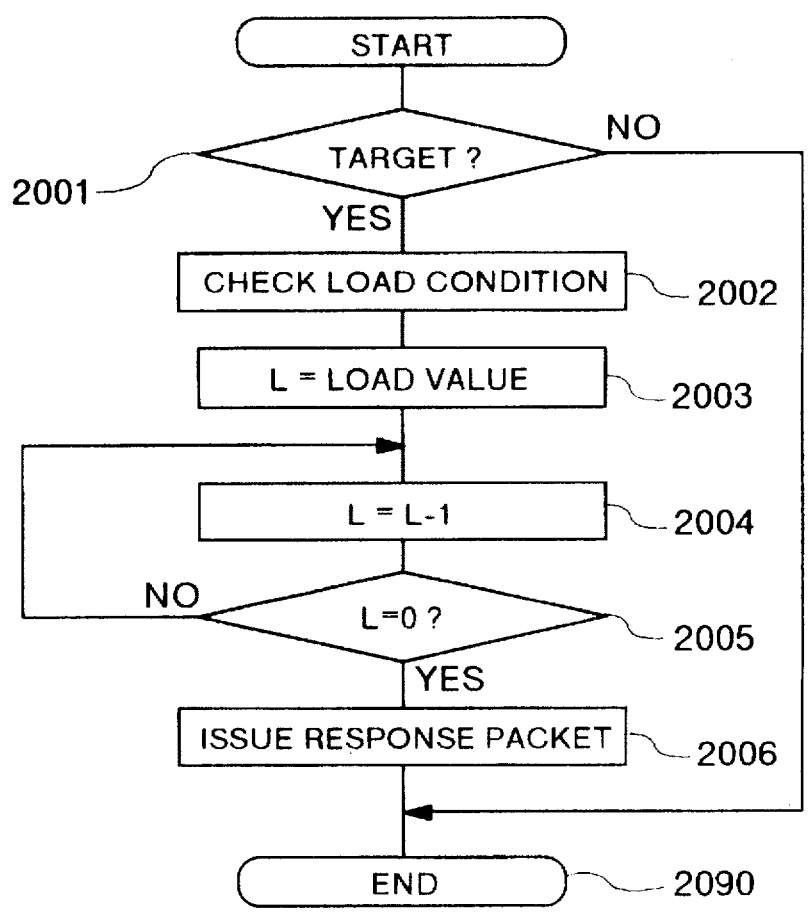
FIG. 20 is a flowchart showing the process for delaying the response to a processing request by broadcasting in accordance with the load condition of the information processing system operated by a server component in the second embodiment.

Assume that the response time of the server component to the broadcast RPC or the multicast RPC is changed in accordance with the load condition of the information processing system including the particular server component. It is thus possible to make optimum selection of a server component in the broadcast communication or multicast communication described previously in "Selection by response time using broadcast communication". The procedural sequence for the server component according to this method will be explained with reference to FIG. 20. In the case where this method is used, the responding means of each server component for the broadcast communication includes a storage area of a variable (assumed to be L) which is a numeric value of the load condition of the server information processing system including the particular server component.

First, the responding means of the server component for the broadcast communication checks to see whether the broadcast packet received is the one to be processed by the particular server component, and if it is not, completes the process (step 2001). If the packet is the one to be processed by the server component, on the other hand, the responding means checks the load condition of the information processing system including the server component (step 2002), and substitutes the numeric version of the load condition into the variable L (step 2003). Next, the responding means counts down until the variable L becomes 0 (step 2004), while at the same time delaying the transfer to the next step by the period of time proportional to the load value (step 2005). After the delay processing (steps 2004, 2005), the responding means issues a response packet indicating that the processing is possible to the client component that called for the processing (step 2006), and thus completes the receiving process of the broadcast packet (step 2090).

In this way, in response to the call using the broadcast communication from a client component (RPC driver 102), each server component issues a response packet indicating that the processing by the server component is possible after a delay time proportional to the load condition of the information processing system including the particular server component. As a result, as in the case of "Selection by response time using broadcast communication", selection of the fastest-responding server component by the RPC driver 102 makes it possible to select a server component on an information processing system having the lightest load condition.

Each of the six methods of selection described above may be used on a stand-alone basis or in combination. Also, these selection means may be included in the name server 151 to select one of a plurality of candidates which may exist. As another alternative, such candidates may be assigned the order of priority in which a response is sent to the source inquiring the name server 151.

According to the second embodiment under consideration, the SQL conversion unit meeting all types of DBMSs are not necessarily included in all the information processing systems having access management means. Instead, SQL conversion unit of a required type on a given information processing system may be provided. Thus introduction and maintenance is facilitated.

Also, according to the second embodiment, the access management component and the SQL conversion unit can be installed on a plurality of information processing systems. Therefore, the access management component on a first information processing system can issue a processing request by RPC to the SQL conversion unit on other information processing system. As a consequence, the processing load can be distributed among a plurality of information processing systems.

Figure 6:
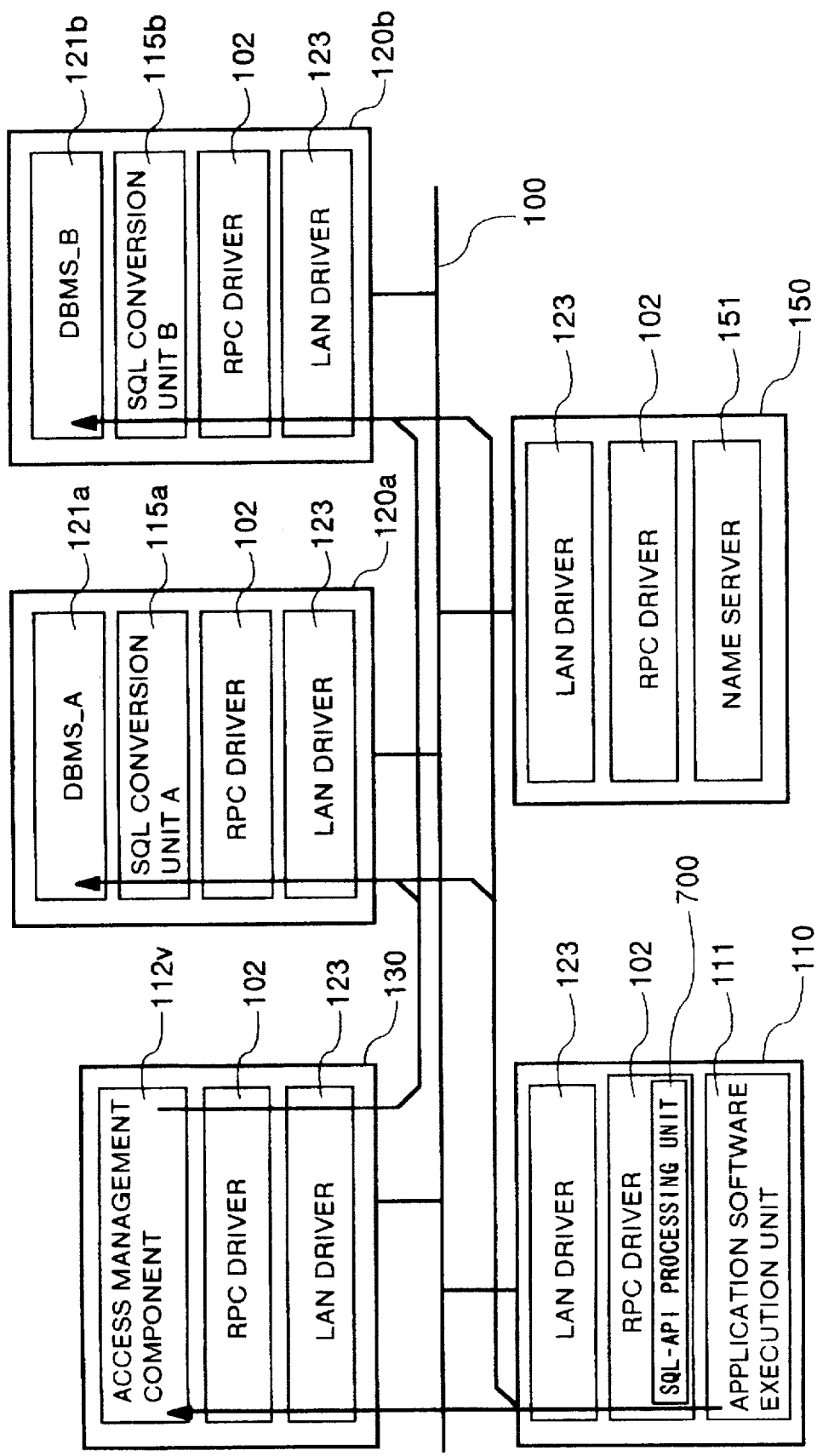
FIG. 6 is a diagram showing the configuration of a database access system according to a third embodiment.

According to a third embodiment, the SQL conversion unit A 115a and the SQL conversion unit B 115b that have been operated on the gateway information processing system 130 in the first embodiment are installed on the server information processing systems 120a and 120b respectively. Also according to this third embodiment, as in the foregoing embodiments, the RPC is used as an interface to the SQL conversion unit A 115a and the SQL conversion unit B 115b. As a result, using the same server component as in the first embodiment, the configuration of the heterogeneous database access system according to the first embodiment shown in FIG. 1 can be modified to the configuration of the heterogeneous database access system of the third embodiment shown in FIG. 6. According to the third embodiment under consideration, each of the server information systems 120a, 120b comprises the SQL conversion unit A 115a and the SQL conversion unit B 115b. The DBMS_A 121a and DBMS_B 121b having different SQL specifications can thus be accessed with a single SQL specification without the intermediary of the gateway information processing system 130.

According to the third embodiment, the RPC driver 102 on the client information processing system 110 includes SQL_API processing means 700 for accessing the data base through the DBMS 121a, 121b with the SQL issued from the application software execution unit 111 as an RPC parameter.

Figure 7:
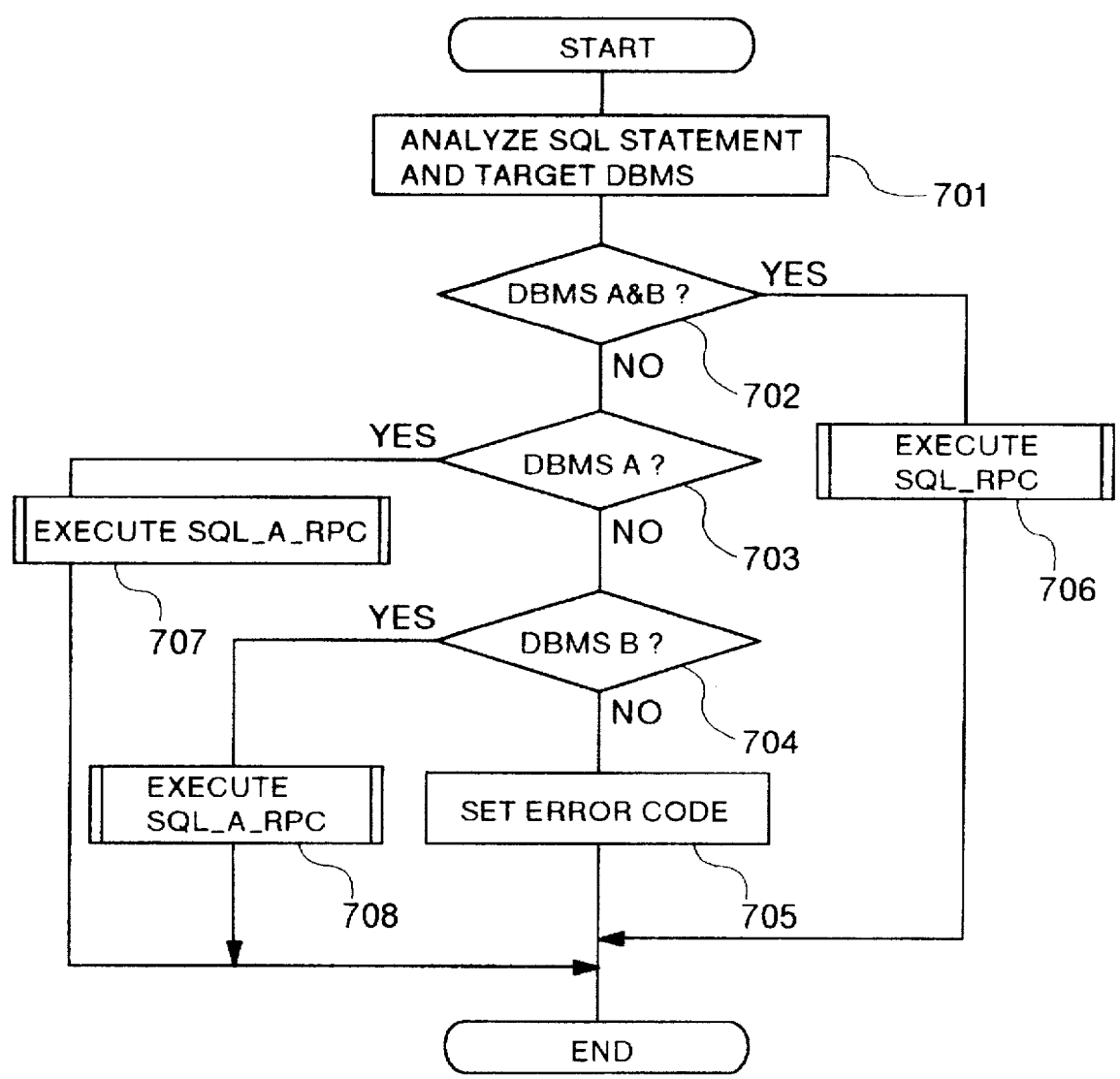
FIG. 7 is a flowchart showing the SQL processing at a client according to the third embodiment.

The operation of the SQL_API processing means 700 is shown in FIG. 7. The processing means 700 is included in the RPC driver 102 on the client information processing system 110. First, the SQL_API processing means 700, upon receipt of the SQL statement issued from the application software execution unit 111, analyzes the SQL statement and obtains the DBMS information of the access destination (step 701). The SQL_API processing means 700 then decides whether the access destination includes both DBMS_A 121a and DBMS_B 121b, only DBMS_A 121a or only DBMS_B 121b (steps 702, 703, 704).

In the case where the access destination includes both DBMS_A 121a and DBMS_B 121b, the SQL_API processing means 700 issues the SQL_RPC with the SQL statement involved as a parameter (step 706). This SQL_RPC is sent to the access management component 112v of the gateway information processing system 130 where it is processed in the same manner as in the first embodiment.

In the case where the access destination includes only DBMS_A 121a or DBMS_B 121b, on the other hand, the SQL_API processing means 700 issues SQL_A_RPC (step 707) or SQL_B_RPC (step 708), and accesses DBMS_A 121a or DBMS_B 121b without the intermediary of the gateway information processing system 130.

In the case where the designated access destination is neither DBMS_A 121a nor DBMS_B 121b, the SQL_API processing means 700 sets an error code (step 705) and thus completes the process (step 709).

In this way, according to the third embodiment, the gateway information processing system 130 is used only for the case in which the SQL statement designating simultaneous access to DBMS_A 121a and DBMS_B 121b is processed. In the case where the SQL statement designating the access to only one of the DBMSs is processed, on the other hand, the SQL_API processing means 700 accesses the particular DBMS directly but not through the gateway information processing system 130. As a consequence, the third embodiment saves the performance reduction which otherwise might occur due to the intermediary of the gateway information processing system.

Also, according to the third embodiment, in the case where the target DBMS is apparent and single, the SQL conversion unit can be accessed directly but not through the access management component from the user application software, and therefore the overhead can be reduced.

The SQL_API processing means 700 according to this embodiment can be applied also to the first embodiment. As a result, in the case where the target DBMS is apparent and single, the SQL conversion unit can be accessed directly but not through the access management component also according to the first embodiment, thereby reducing the overhead.

According to the first to third embodiments described above, access to a plurality of DBMSs of various SQL specifications is implemented from the application software execution unit 111 of an arbitrary SQL specification. The fourth embodiment, in contrast, realizes access to a DBMS from the application software execution unit 111 using a variety of different SQL specifications.

Figure 8:
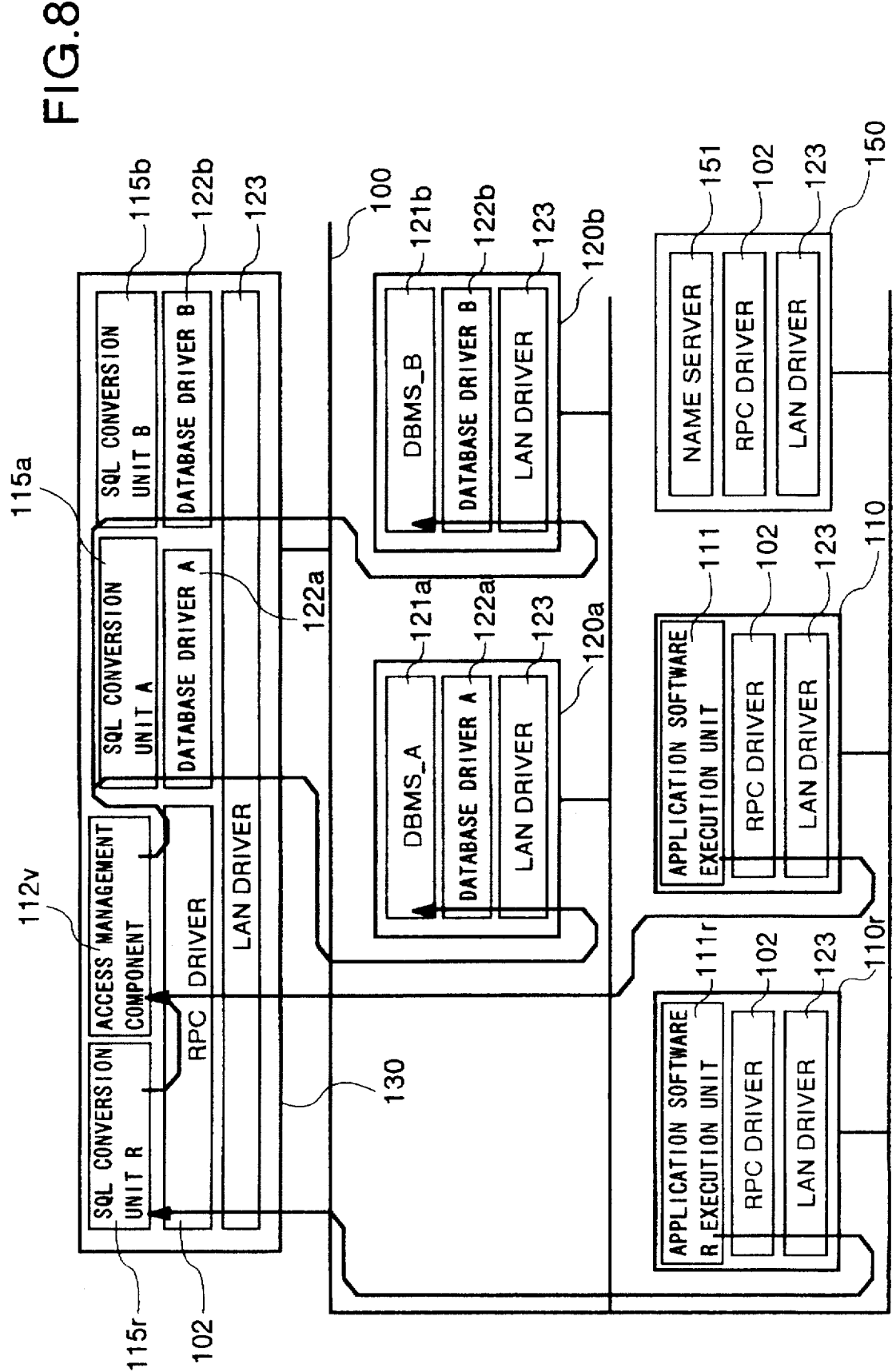
FIG. 8 is a diagram showing the configuration of a database access system according to a fourth embodiment.

The configuration of a heterogeneous database access system according to the fourth embodiment is shown in FIG. 8. The fourth embodiment, as shown in FIG. 8, in addition to the component parts of the heterogeneous database access system according to the first embodiment shown in FIG. 1, further comprises a client information processing system 110r and a non-standard SQL conversion unit 115r on the gateway information processing system 130, as compared with the configuration of the heterogeneous database access system according to the first embodiment shown in FIG. 1. The client information processing system 110r, which has a configuration similar to the client information processing system 110, comprises application software execution unit 111r of non-standard SQL specification in place of the application software (R) execution unit 111 of standard SQL specification. Also, the non-standard SQL conversion unit 115r is for converting the non-standard SQL into the standard SQL.

The RPC including the SQL statement of non-standard specification (hereinafter called SQL_r_RPC) issued from the application software execution unit 111r is sent by the RPC driver 102 to and processed at the non-standard SQL conversion unit 115r of the gateway information processing system 130 through the LAN driver 123 and the LAN 100. The SQL statement converted into the standard SQL statement from the non-standard SQL by the non-standard SQL conversion unit 115r is sent to the access management component 112v as an RPC parameter. Subsequent processings are similar to those for the first embodiment. After conversion into the SQL of the specification of the target DBMS by the SQL conversion unit 115, the SQL statement is used to access the particular DBMS with the result returned to the application software execution unit 111r.

In this way, according to the fourth embodiment, provision of the component for converting the non-standard SQL into the standard SQL permits access to the DBMS of an SQL specification different from the application software execution unit 111r of a variety of different SQL specifications.

Now, explanation will be made about a heterogeneous database access system in which a given DBMS having a communication protocol specification and SQL specification different from those of another DBMS having a dedicated program structure of the client information processing system can be accessed without changing the program structure of the particular client information processing system.

Figure 11:
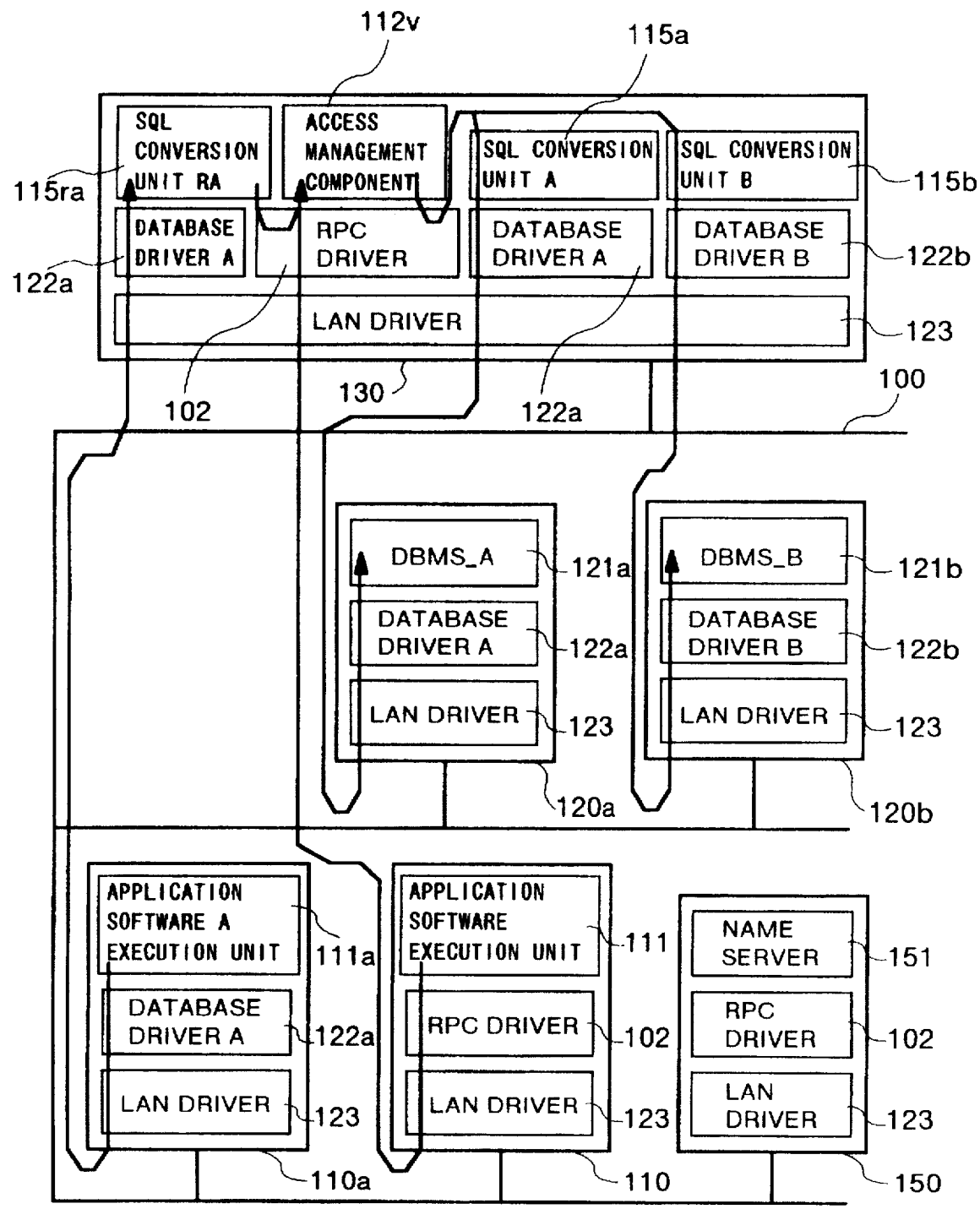
FIG. 11 is a diagram showing the configuration of a database access system according to a fifth embodiment.

According to the fifth embodiment, the network 100 is connected with a client using RPC and a client using no RPC. This embodiment, as shown by the configuration of the heterogeneous database access system shown in FIG. 11 and unlike in the configuration of the heterogeneous database access system according to the first embodiment shown in FIG. 1, further comprises a client information processing system 110a and non-standard SQL conversion unit RA 115ra on the gateway information processing system 130.

The client information processing system 110a includes application software A execution unit 111a, a database driver A 122a and a LAN driver 123. The application software A execution unit 111a is software execution means of non-standard SQL specification, and has the function of issuing a non-standard SQL statement and receiving a response. The database driver A 122a of the client information processing system 110a notifies the non-standard SQL statement issued by the application software A execution unit 111a to the database driver A 122a of the gateway information processing system 130. The database driver A 122a has the same SQL specification as the DBMS_A 121a.

The non-standard SQL conversion unit RA 115ra of the gateway information processing system 130, on the other hand, converts an input non-standard SQL statement into a standard SQL statement and outputs it to the RPC driver 102 of the gateway information processing system 130.

According to the fifth embodiment, the standard SQL statement converted through the database driver 122a and the non-standard SQL conversion unit RA 115ra is sent to the RPC driver 102 of the gateway information processing system 130, and thus the data base is accessed by the SQL statement issued by the application software A execution unit 111a.

The SQL statement of the specification, i.e., the non-standard specification of the DBMS_A 121a issued from the application software execution A unit 111a is sent by the database driver 122a through the LAN driver 123 and the LAN 100 to and processed appropriately at the non-standard SQL conversion unit RA 115ra on the gateway information processing system 130. The non-standard SQL conversion unit RA 115ra converts the non-standard SQL statement thus received into the standard SQL and notifies it to the access management component 112v as an RPC parameter. Subsequent processes are similar to those of the first embodiment, and are such that after conversion into a SQL of the specification of the target DBMS at the SQL conversion unit 115, the particular SQL statement is used to access the DBMS, with the result thereof returned to the application software A execution unit 111r.

As described above, according to the fifth embodiment, means for converting a non-standard to a standard SQL is added to the system of the first embodiment, so that a first DBMS having a communication protocol specification and a SQL specification different from a second DBMS can be accessed using a non-standard SQL and a non-standard database driver unique for the second DBMS without changing the program structure of the client information processing system configured for the first DBMS.

According to the fifth embodiment, the client information processing system 110a and the gateway information processing system 130 are connected by the use of the database driver A 122a. This driver, however, may use an RPC having a specification different from the above-mentioned RPC.

Figure 19:
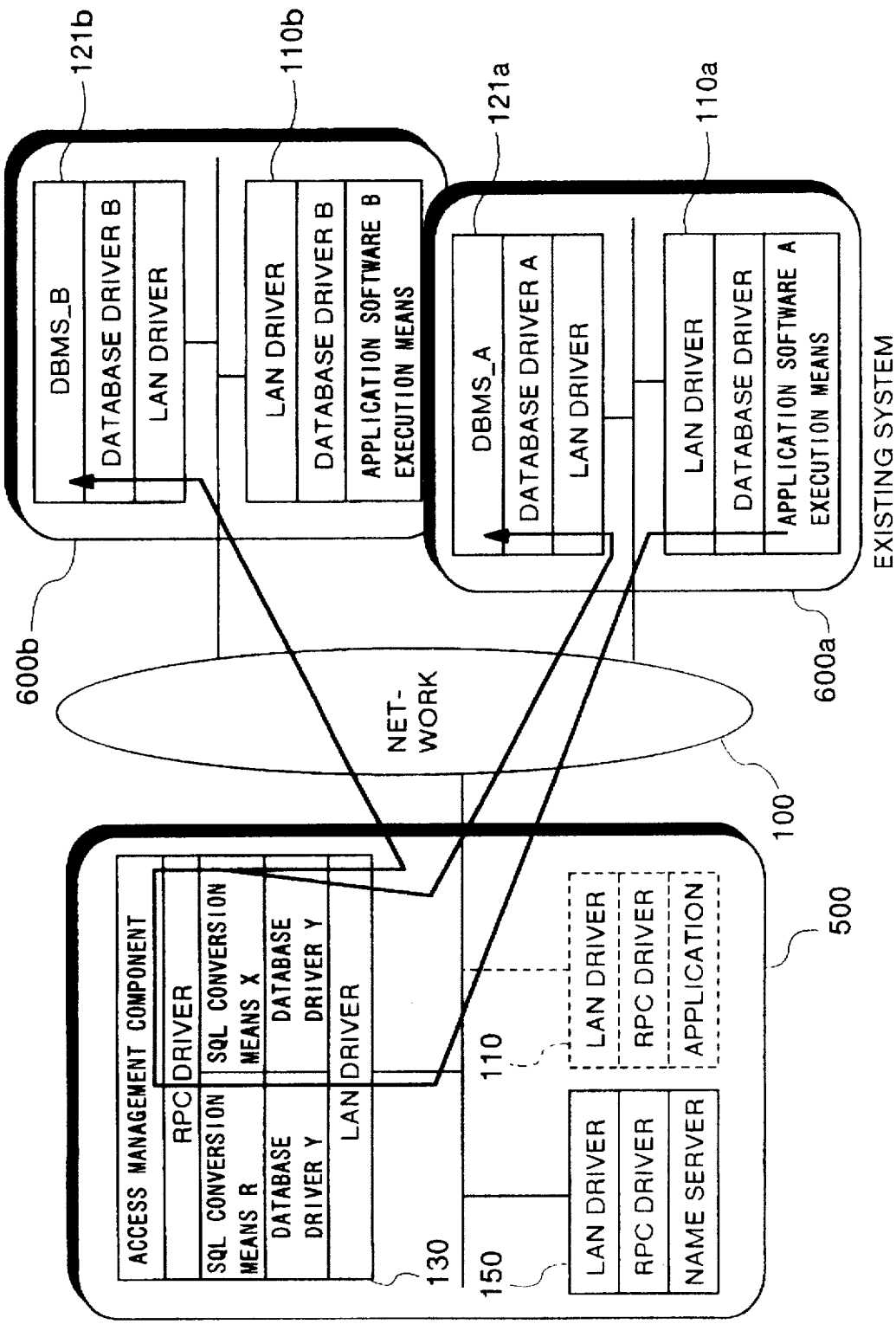
FIG. 19 is a diagram showing another configuration of the database access system according to the fifth embodiment.

Explanation will be made with reference to FIG. 19 about an example application of the heterogeneous database access system according to the fifth embodiment as applied to a network 100 connected with two conventional systems 600a and 600b having database management systems of different specifications.

The system 600a includes a server information processing system 121a and a client information processing system 110a having application software A execution unit and a database driver A unique to the DBMS_A. The system 600b, on the other hand, includes a server information processing system 121b using the DBMS_B and a client information processing system 110b having an application software B execution unit and a database driver B unique to the DBMS_B.

A system 500 including the above-mentioned gateway information processing system 130 and the name server information processing system 150 is added to the conventional systems 600a and 600b. In this way, the client information processing system 110a can access the DBMS_B having a SQL specification different from the client information processing system 110a which is included in the server information processing system 121b without changing the configuration of the conventional systems 600a, 600b.

[Configuration of heterogeneous database access system]

Figure 38:
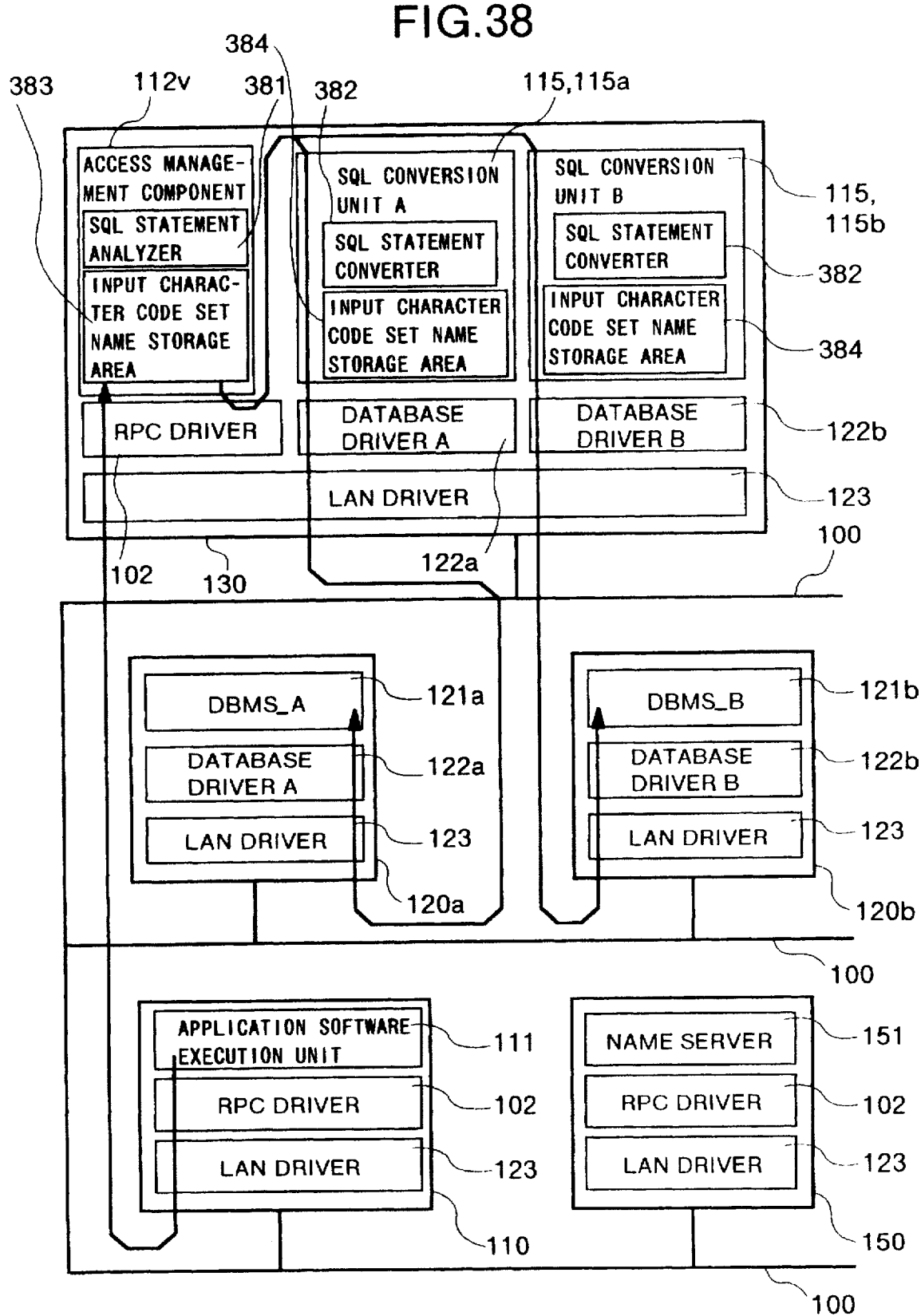
FIG. 38 is a diagram showing the configuration of a database access system according to the sixth embodiment.

Now, explanation will be made with reference to FIG. 38 about an embodiment for realizing a database access system in which the application software execution unit 111 is capable of using various character code sets. The configuration of the heterogeneous database access system according to the sixth embodiment is similar to that of the first embodiment shown in FIG. 1. According to the sixth embodiment, the access management component 112v includes a SQL statement analyzer 381 for analyzing the SQL statement. Also, the SQL conversion unit 115 includes a SQL statement converter 382 for converting the SQL statement. The character code set that can be handled at the SQL statement analyzer of the access management component 112v and the SQL statement converter of the SQL conversion unit 115 is assumed to be the JIS code.

[Processing of SQL_RPC]

Figure 21:
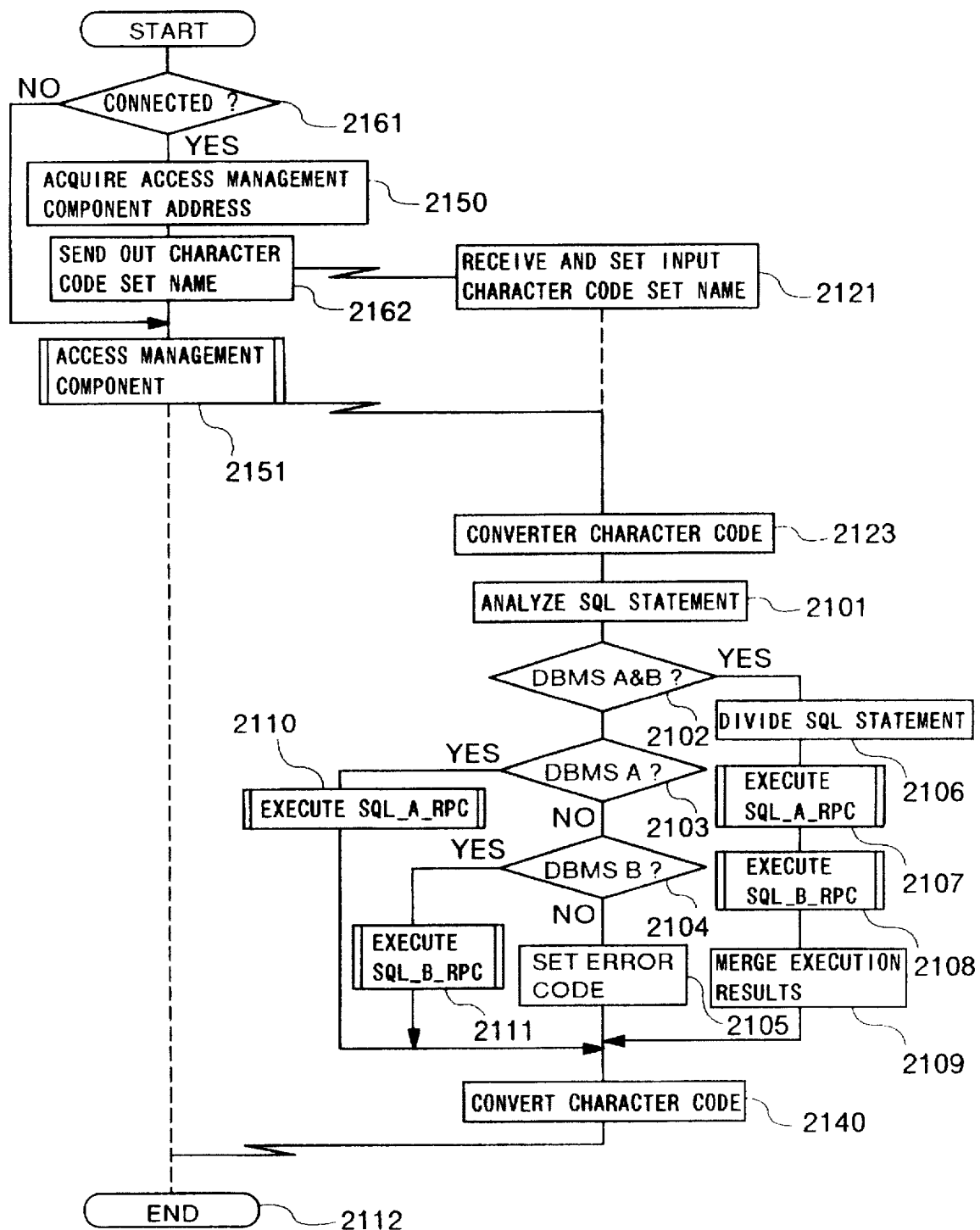
FIG. 21 is a flowchart showing the processing for the RPC issued to an access management component from a client information processing system according to a sixth embodiment.

The procedure for processing the SQL_RPC issued by the application software execution unit 111 is shown in FIG. 21.

[Processing at RPC driver 102]

When the SQL_RPC is issued by the application software execution unit 111, the RPC driver 102 of the client information processing system 110 first decides whether it is a statement for connection to a data base (step 2161). In the case where the statement is for connection to a data base, steps 210 and 2162 are executed, after which the process is passed to step 2151. If the statement is other than for connection, by contrast, the process proceeds directly to step 2151.

Step 2150 causes the RPC driver 102 to access the name server 151 on the name server information processing system 150, and acquires the physical position of the access management component 112v providing a server for processing the SQL_RPC to be processed, i.e., the network address and the port number of the server component. Next, the RPC driver 102 sends out the character code set name used for the SQL statement by the application software execution unit 111 to the access management component 112v. The access management component 112v that has received the character code set name stores the particular input character code set name in the storage area 383 in the memory unit 1001 of the gateway information processing system 130.

Finally, the RPC driver 102 establishes connection to the access management component 112v by RPC and requests the access management component 112v to process the SQL_RPC (step 2152).

[Processing at access management component 112v]

Steps 2101 to 2111, 2121 to 2123 and 2140 are the processes performed at the access management component 112v.

The access management component 112v which was requested to process SQL_RPC converts the character code of the SQL statement sent as a parameter of SQL_RPC notified from the RPC driver 102 into the JIS code with reference to the input character code set name held in the storage area 383 (step 2123). In the case where the input character code set name notified at step 2121 is the JIS code, however, conversion is not required and therefore is not performed. Next, the access management component 112v analyzes the SQL statement subjected to character code conversion and obtains the name of the DBMS containing an access destination table (step 2101).

In the case where it is detected that the access destination includes both DBMS_A 121a and DBMS_B 121b as the result of analysis (step 2102), the access management component 112v, like at step 406 of the first embodiment, divides the SQL statement to be processed into the access to DBMS_A 121a and the access to DBMS_B 121b to create two SQL statements (step 2106). The access management component 112v, using the SQL_RPCs (called SQL_A_RPC and SQL_B_RPC respectively) with these SQL statements as a parameter, makes access to DBMS_A 121a at step 2107 and to DBMS_B 121b at step 2108. Upon receipt of the response from DBMS_A 121a, DBMS_B 121b, the access management component 112v merges the results obtained at steps 2107 and 2108, and thus prepares the result corresponding to the SQL statement before division at step 2106 (step 2109).

In the case where it is detected that the access destination is DBMS_A 121a or DBMS_B 121b (step 2103 or 2104), by contrast, the access management component 112v issues the RPC (SQL_A_RPC or SQL_B_RPC) with the SQL statement as a parameter and obtains the result of access at step 2110 or 2111 respectively.

In the case where the access destination is neither DBMS_A 121a nor DBMS_B 121b, the access management component 112v sets the error code (step 2105).

Finally, the access management component 112v converts the access result obtained at steps 2109 to 2111 or the error code set at step 2105 from the JIS code into the character code indicated by the input character code set name held in the storage area 383 (step 2140), and like at step 412 of the first embodiment, returns it to the application software execution unit 111 as a return value of the remote procedure call thereby to complete the SQL_RPC (step 2112).

[Processing of SQL_x_RPC (steps 2107 to 2108, 2110 to 2111)]

Figure 22:
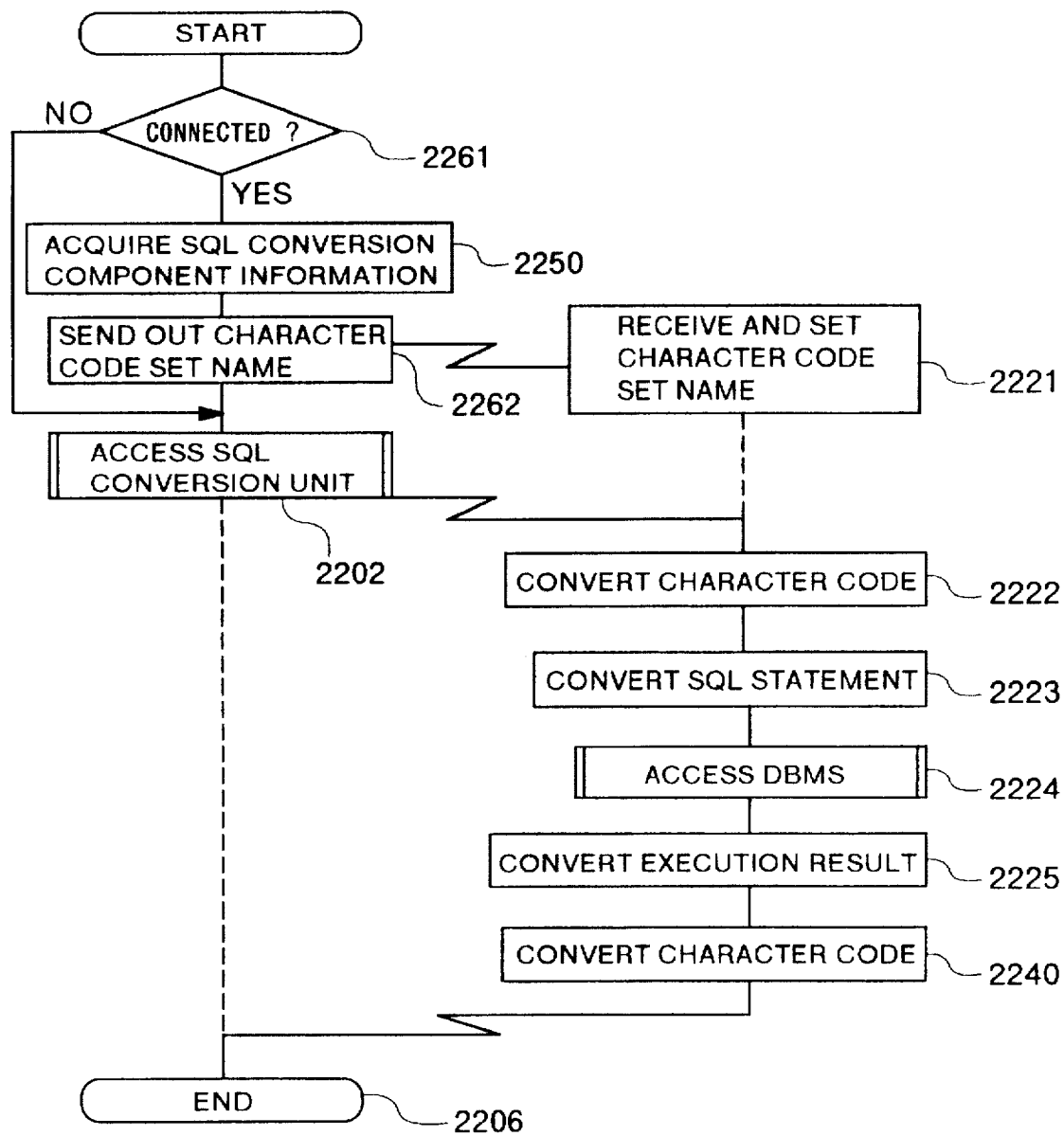
FIG. 22 is a flowchart showing the processing for the RPC issued to SQL conversion unit from an access management component according to the sixth embodiment.

The flow of processing of SQL_A_RPC or SQL_B_RPC is shown in FIG. 22. The processings of SQL_A_RPC and SQL_B_RPC have the same procedure, and therefore they are combined here by way of explanation. Also, the SQL conversion unit A 115a and the SQL conversion unit B 115b providing a server for processing SQL_x_RPC will be collectively called SQL conversion unit 115.

With notification of SQL_x_RPC, the RPC driver 102 of the gateway information processing system 130 first decides whether it is a statement for connection to the data base (step 2261). If it is a connection statement, the name server 151 on the name server information processing system 150 is accessed to acquire the physical position of the SQL conversion unit, i.e., the network address and the port number of the server component (step 2250).

Then the RPC driver 102 sends out the "JIS" that is the output character code set name of the access management component 112v (according to the sixth embodiment under consideration, the character code used for input/output of the access management component 112v is predetermined to be the JIS code) to the SQL conversion unit 115 (step 2262). The SQL conversion unit 115 that has received this name stores it as an input character code set name in the storage area 384 of the memory unit 1001 (step 2221).

Finally, the RPC driver 102 establishes connection with the SQL conversion unit 115 by RPC, and requests the SQL conversion unit 115 to process the SQL_x_RPC (step 2202).

Steps 2222 to 2240 represent processes at the SQL conversion unit 115. The SQL conversion unit 115, in response to a request, first converts the character code of the SQL statement sent thereto as an RPC parameter into the JIS code. At the same time, the JIS providing the character code set after conversion is stored as an environmental variable referenced by the database driver 122 to obtain the character code set name in a format of expression determined by the database driver 122 (step 2222).

According to this sixth embodiment, however, the input character code set name is "JIS", requiring no conversion, and therefore the input character code set name is stored as an environmental variable of the database driver 122 without performing any conversion. This step is effective for the case in which, as shown in the second embodiment, the access management component 112v accesses the SQL conversion unit 115 of a different gateway information processing system 130 or for the case in which, as shown in the third embodiment, the SQL conversion unit 115 is accessed from the application software execution unit 111 not through the access management component 112v.

Now, the SQL conversion unit 115 converts the SQL statement of standard specification received as a RPC parameter into the SQL specification of a target DBMS (step 2223), and then sends the SQL statement prepared by conversion to the target DBMS, thus obtaining the notification on the result of execution of the SQL statement from the target DBMS (step 2224).

The data and the return code obtained as a result of execution at step 2224 is converted by the SQL conversion unit 115 into the standard SQL specification from the SQL specification of the target DBMS (step 2225). Further, the conversion result is converted into the character code indicated by the input character code set name stored in the storage area 384 at step 2221 (step 2240). Finally, the SQL conversion unit 115 notifies the result obtained by conversion to the access management component 112ν as a return data or a return code, thus completing the process of SQL_x_RPC (step 2206).

As described above, according to the sixth embodiment, the application software execution unit 111 can access a data base without being aware what kind of character code set is used internally for processing by the access management component 112ν, the SQL conversion unit 115 and the DBMS_121a, 121b. The application software execution unit 111 is not required either to be aware of the fact that the method of designating the character code set name is different with the database driver of each DBMS.

According to the sixth embodiment under consideration, the character code set that can be handled at the SQL statement analyzer of the access management component 112ν and the SQL statement converter of the SQL statement conversion means 115 are assumed to be the JIS code. However, other character code sets can be used with equal effect. Also, the first and/or second selection means according to the second embodiment may be included in the RPC driver 102.

Further, apart from the character code set name, if the order of character codes for sequencing the result of database search or the language used for the error message is designated by exchange between the RPC driver 102 of the client information processing system 110 and the access management component 112ν as in the case of the input character code set name according to the sixth embodiment, a data base can be accessed without being aware of the designation difference.

Figure 30:
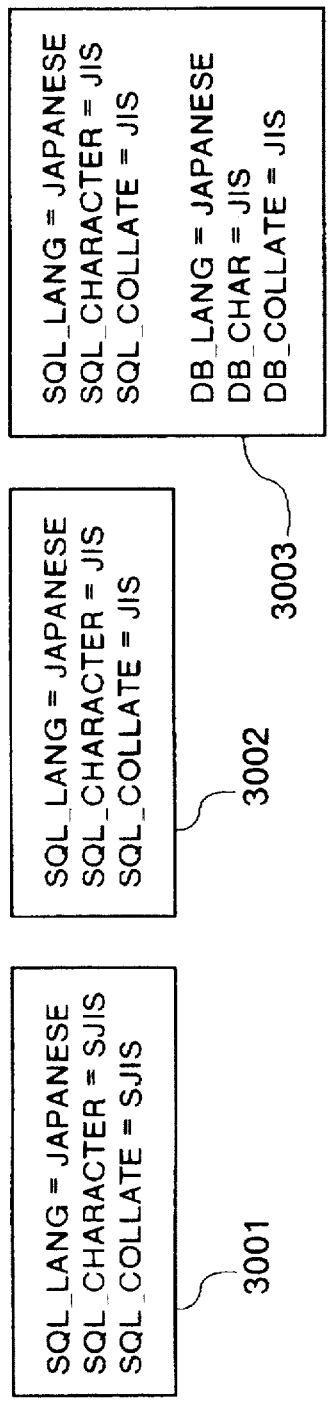
FIG. 30 is a diagram for explaining an example setting of the character code according to the sixth embodiment.

FIG. 30 shows an example of the environmental variables for setting the sequencing code, the character code set and the language. The environmental variable set 3001 is an example of environmental variables for the application software execution unit 111, the environmental variable set 3002 an example of environmental variables for the access management component 112ν, and the environmental variable set 3003 an example of environmental variables for the processes of the DBMS 121a, 121b and the SQL conversion unit 115.

In the environmental variable sets 3001 to 3003, SQL_LANG is the name of a variable indicating the type of the language used, SQL_CHARACTER the name of a variable indicating the character code set used, and SQL_COLLATE the name of a variable indicating the sequencing code. According to the sixth embodiment, the application software execution unit 111, the access management component 112ν and the SQL conversion unit 115 all use the Japanese language. Also, the application software execution unit 111 has JIS as a character code set and a sequencing code. On the other hand, the character code set and the sequencing code of the access management component 112ν and the SQL conversion unit 115 is JIS.

With the environmental variable set 3003, DB_LANG is the name of an environmental variable indicating the type of the language used (the type of the language used by DBMS 121a, 121b) accessed by the database driver 122. The character code set used by DBMS 121a, 121b is indicated by the variable of the environmental variable name DB_CHARCTER. Further, the sequencing code used by DBMS 121a, 121b is indicated by the variable of the environmental variable name DB_COLLATE. According to this sixth embodiment, the language used by DBMS 121a, 121b is Japanese. Also, the character code set and the sequencing code used by DBMS 121a, 121b is JIS.

Figure 36:
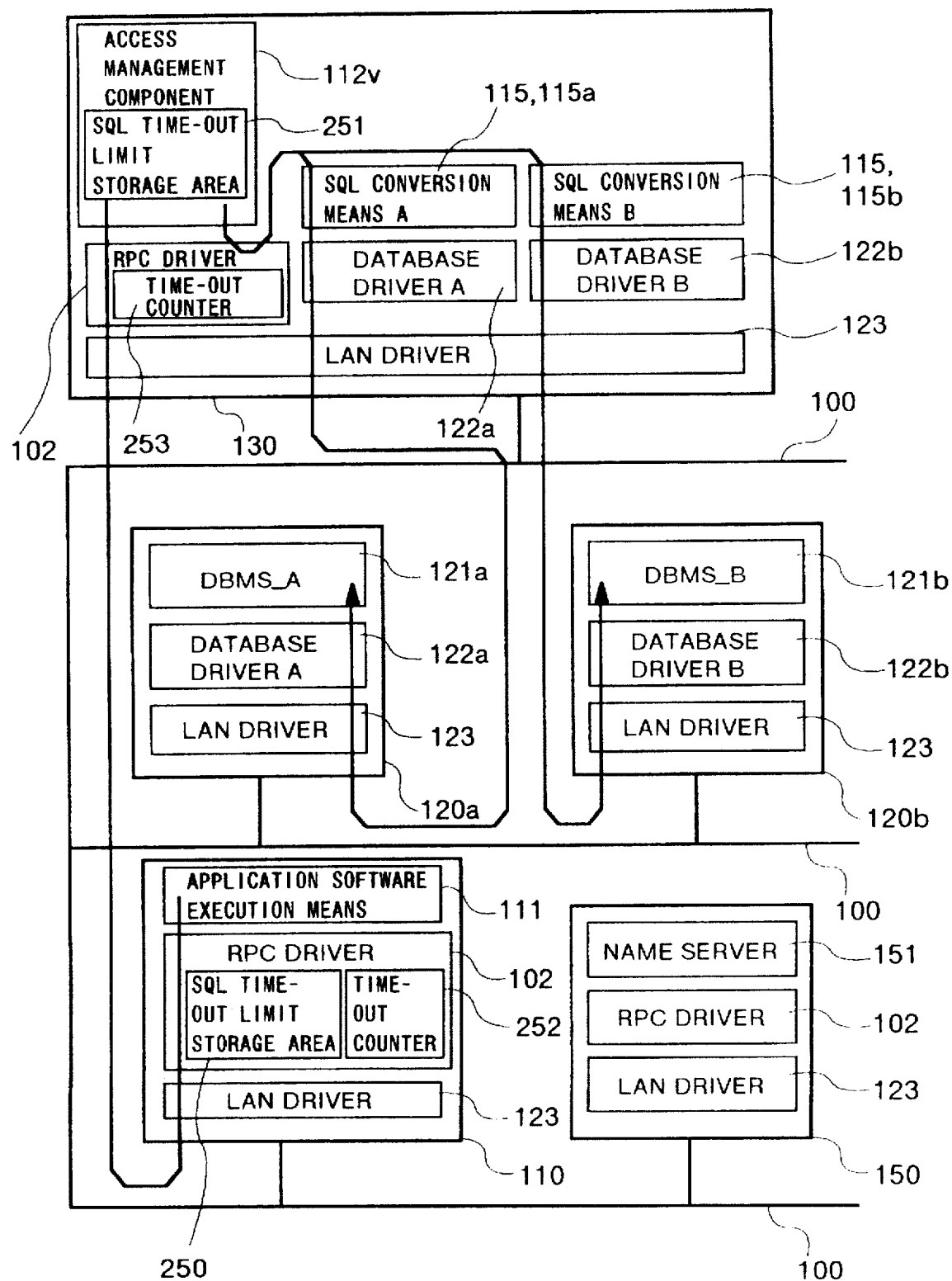
FIG. 36 is a diagram showing the configuration of a database access system according to the seventh embodiment.

Now, explanation will be made about an embodiment in which the function of terminating the request to access the data base at a time limit set by the user is added to the first embodiment. FIG. 36 shows the configuration of a heterogeneous database access system according to a seventh embodiment. The heterogeneous database access system according to the seventh embodiment, which has a configuration similar to the system of the first embodiment shown in FIG. 1, is such that, as shown in FIG. 36, the main memory unit 1001 of both the client information processing system 110 and the gateway information processing system 130 includes storage areas 250, 251 for holding a SQL time-out limit respectively. Also, the RPC driver 102 of the client information processing system 110 according to the seventh embodiment includes a time-out counter 252 for timing operation. The RPC driver 102 of the gateway information processing system 130 also includes a time-out counter 253 for timing operation.

[Flow of SQL_RPC operation]

Figure 25:
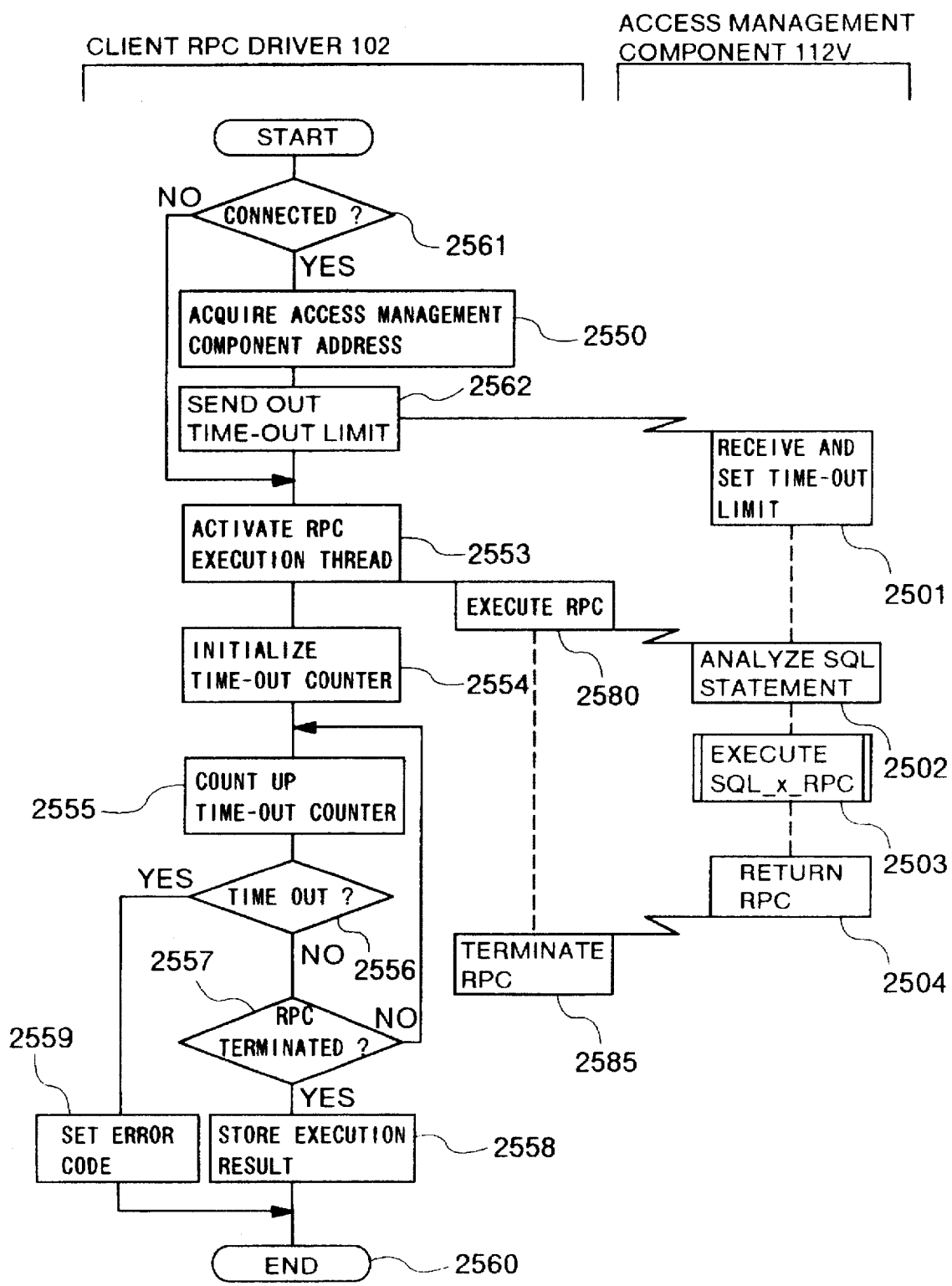
FIG. 25 is a flowchart showing the processing for the RPC issued to an access management component from a client information processing system according to a seventh embodiment.

The SQL_RPC processing according to the seventh embodiment is shown in FIG. 25. In the seventh embodiment, as in the first embodiment, the SQL_RPC issued from the application software execution unit 111 on the client information processing system 110 is notified to the access management component 112ν on the gateway information processing system 130 by the RPC driver 102 of the client information processing system 110 and is processed by the access management component 112ν.

According to the seventh embodiment, unlike the first embodiment, in the case where no response to a request made by RPC to the access management component 112ν for processing SQL_RPC is received from the access management component 112ν after the lapse of a predetermined SQL time-out limit, the RPC driver 102 of the client information processing system 110 terminates the process and decides on an error. According to the seventh embodiment, the SQL time-out limit is stored in advance in the storage area 250 of the main memory unit 1001 of the client information processing system 110.

The RPC driver 102 of the client information processing system 110 that has received the SQL_RPC issued by the application software execution unit 111 decides whether the statement is for connection to the DBMS or not (step 2561). In the case where the statement is for connection, steps 2550 and 2562 are executed, followed by step 2553. In the case where the statement is other than for connection, by contrast, step 2553 is executed directly.

Step 2550 causes the RPC driver 102 to access the name server 151 on the name server information processing system 150, and thus acquires the physical position of the access management component 112ν providing a server for processing the SQL_RPC involved, that is, the network address and the port number of the server component. Next, the RPC driver 102 sends out the SQL time-out limit held in the storage area 250 of the memory unit on the client information processing system 110 to the access management component 112v at step 2562. The access management component 112v that has received this SQL time-out limit stores the SQL time-out limit received in the storage area 251 of the gateway information processing system 130 (step 2501).

Then, the RPC driver 102 activates a RPC execution thread (step 2553). The thread is defined as a subdivided unit of a process which is processed in parallel by time division. The RPC execution thread thus activated establishes connection with the access management component 112v by RPC, and requests the access management component 112v to process the SQL_RPC mentioned above (step 2580).

Steps 2501 to 2504 represent the processing at the access management component 112v. As in the processing described with reference to FIG. 4 in the first embodiment, the access management component 112v according to this seventh embodiment, upon receipt of a processing request, performs such processings as SQL statement analysis (step 2502) and issuance of the SQL_x_RPC (step 2503). The result of the processing is notified to the RPC driver 102 (parent thread) that has activated the RPC execution thread, the requester, and after notifying the termination of the processing to the RPC execution thread, the requester, terminates the RPC processing (step 2504).

The RPC execution thread that has requested the processing at step 2580 is held in waiting status until the receipt of a termination signal from the access management component 112v (step 2504), and upon receipt of a termination notice, completes the thread (step 2585).

The parent thread that has activated the RPC execution thread at step 2553, on the other hand, initializes the time-out counter 252 (step 2554) and then counts it up (step 2555), thus checking to see whether the value held in the time-out counter 252 exceeds the value held in the SQL time-out limit storage area 250 (step 2556). If the value held in the SQL time-out limit storage area 250 is not exceeded, another checking is made to see whether the RPC execution thread is already terminated or not (step 2557).

When the RPC execution thread is not yet terminated, the parent thread returns the process to step 2555, so that the time-out counter is counted up and the time lapse checked repeatedly. According to the seventh embodiment under consideration, upon activation of the RPC execution thread, predetermined identification information is stored in the main memory unit 1001 of the client information processing system 110. The RPC execution thread, at the time of termination (step 2585), removes the identification information. The termination check of the RPC execution thread at step 2557 is effected by confirming whether the particular identification information is held in the memory unit of the client information processing system 110.

In the case where a time-out is decided as the result of time-out check at step 2556, the parent thread stores the error code in a predetermined area (step 2559), and thereby terminates the process of SQL_RPC (step 2560). In setting the error code (step 2559), according to the present seventh embodiment, the parent thread cuts off the connection between the RPC execution thread and the access management component 112v thereby to terminate the RPC execution thread.

In the case where a termination is decided as the result of the RPC execution thread termination check at step 2557, the execution result is stored in a predetermined area (step 2558) thereby terminating the SQL_RPC process (step 2560).

[Processing of SQL_x_RPC (step 2503)]

Figure 26:
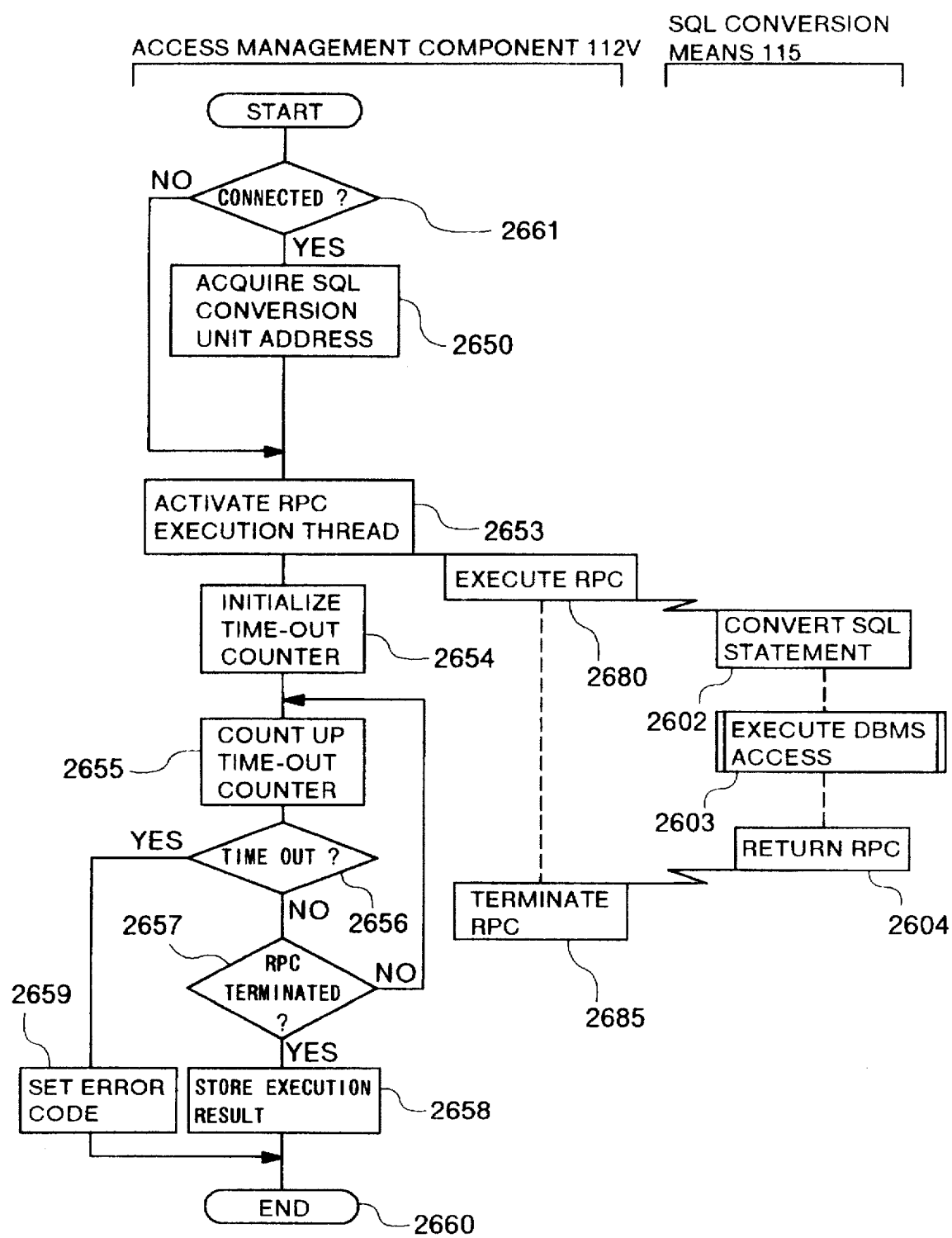
FIG. 26 is a flowchart showing the processing for the RPC issued to the SQL conversion unit from an access management component according to the seventh embodiment.

FIG. 26 shows the processing of SQL_x_RPC issued by the access management component 112v according to the seventh embodiment. In this seventh embodiment, the SQL_RPC processing by the SQL conversion component 115 requested by the access management component 12v is terminated and an error is decided in the case where the particular processing is not carried out within a predetermined time length.

The procedure for processing is similar to the SQL_RPC processing described above. In the SQL_RPC processing, however, the value stored in the storage area 251 at step 2501 (shown in FIG. 25) is used as a SQL time-out limit.

First, the RPC driver 102 of the gateway information processing system 130 that has received the SQL_x_RPC issued by the access management component 112v decides whether the statement is for connection to a DBMS (step 2661), and if it is for such connection, executes step 2650 and then step 2653. In the case where the statement is not for connection, on the other hand, step 2653 is executed directly.

At step 2650, the RPC driver 102 accesses the name server 151 on the name server information processing system 150, and acquires the physical position (network address and port number) of the SQL conversion unit 115 for processing the SQL_x_RPC to be processed.

Next, the RPC driver 102 activates the RPC execution thread (step 2653). The RPC execution thread thus activated establishes connection with the SQL conversion unit 115 by RPC and requests the SQL conversion unit 115 to process the SQL_x_RPC (step 2680).

Steps 2602 to 2604 represent the processing of the SQL conversion unit 115. The SQL conversion unit 115, upon receipt of a processing request, analyzes the SQL statement (step 2602), accesses and receives a response from a DBMS (step 2603), notifies the processing result to the RPC driver 102 (parent thread) that activated the requester RPC execution thread, and further notifies the termination of process to the requester RPC execution thread thereby to terminate the process (step 2604).

The RPC execution thread that requested the processing at step 2680 is held in waiting status until it receives a termination signal of the SQL conversion unit 115 (step 2604), and upon receipt of a termination notice, terminates the thread (step 2685).

The parent thread that activated the RPC execution execution thread at step 2653, on the other hand, initializes the time-out counter 253 (step 2654), counts up the time-out counter 253 (step 2655), and checks to see whether the value held in the time-out counter 253 exceeds the value held in the SQL time-out limit storage area 251 (step 2656). If the time-out limit is exceeded, the parent thread further checks to see whether the RPC execution thread has terminated (step 2657).

In the case where the RPC execution thread is not yet terminated, the parent thread returns the process to step 2655, and repeatedly counts up the time-out counter and checks the time elapsed. When the RPC execution thread is activated, predetermined identification information is stored in the main memory unit 1001 of the gateway information processing system 130. The RPC execution thread removes the identification information at the time of termination (step 2685). The termination check of the RPC execution thread at step 2657 is effected by confirming whether the particular identification information is held in the memory unit.

In the case where a time-out is decided as the result of time-out check at step 2656, the parent thread stores the error code in a predetermined area (step 2659), thereby terminating the process of SQL_RPC (step 2660). In setting the error code (step 2659), according to this seventh embodiment, the parent thread cuts off the connection between the RPC execution thread and the DBMS and thereby causes the RPC execution thread to be terminated.

In the case where a termination is decided as the result of the RPC execution thread termination check at step 2657, on the other hand, the execution result is stored in a predetermined area (step 2658), thereby terminating the process of SQL_x_RPC (step 2660).

As described above, according to the seventh embodiment, a time-out value is transferred from the application software execution unit 111 to the access management component 112v to the SQL conversion unit 115 before connection with a data base, so that the RPC processing at each of the components described above can be terminated at the SQL time-out limit set by the application software execution unit 111.

Further, according to this embodiment, even in the case where the application software execution unit makes access to a data base through a gateway, the data base access termination time set in the process of operation of the application software execution unit can be reflected in the data base access termination time referenced by the gateway in accessing the data base. It is therefore not necessary to set the data base access termination time separately for the application software execution unit and the gateway.

A similar time-out check may be made when the SQL conversion unit accesses a DBMS. In this case, the RPC driver 102, after execution of step 2650 before execution of step 2653, sends out the SQL time-out limit held in the storage area 251 of the memory unit of the gateway information processing system 130 to the SQL conversion unit 115. The SQL conversion unit 115 that has received this SQL time-out limit stores the SQL time-out limit thus received in the storage area secured as a SQL time-out limit storage area for the SQL conversion unit in the gateway information processing system 130. In this way, when the SQL conversion unit 115 accesses a DBMS, the SQL time-out limit for the SQL conversion unit stored is referenced, so that when the processing time exceeds the time-out limit, an error is decided. A time limit can thus be set also for the DBMS access by the SQL conversion unit 115.

Figure 29:
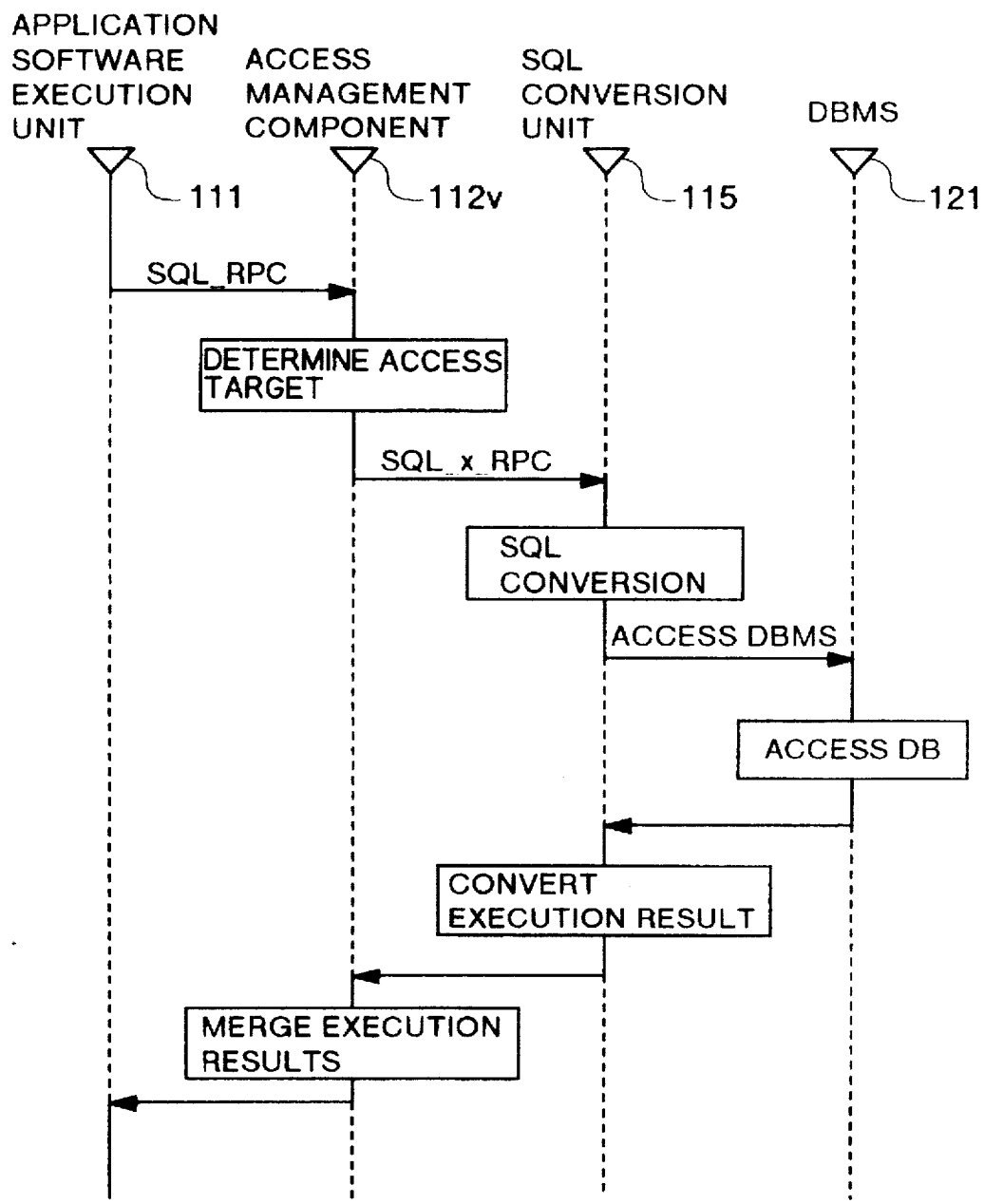
FIG. 29 is a diagram for explaining the sequence of RPCs issued between components according to the seventh embodiment.

The SQL_RPC issued from the application software execution unit 111, as shown in FIG. 29, is executed in a nested form of processings at the access management component 112v, the SQL conversion unit 115 and the DBMS 121. As a result, when the processing time-out limits occur simultaneously for each component, it is impossible for the application software execution unit 111 to rightly recognize a particular component of which the processing has caused the time-out limit to be exceeded by the processing time.

In order to solve this problem, the SQL time-out limit received by the access management component 112v at step 2501 less a predetermined time length is stored as a SQL time-out limit to be used by the access management component 112v.

The components nearer to the application software execution unit 111 than the component (the access management component or the SQL conversion unit) that has detected a time-out error have not yet reached the SQL time-out limit and has not yet terminated the processing thereof at the time of detection of a time-out error. The error code from the component that has detected a time-out error, therefore, be transferred rightly to the application software execution unit 111. In this way, the cause of the excessive processing time can be easily located when the processing is terminated.

The RPC driver 102 according to the seventh embodiment may include the first and/or the second selection means of the second embodiment. Also, each information processing system may include an external memory unit having the storage area that is otherwise included in the main memory unit in the aforementioned cases.

Figure 37:
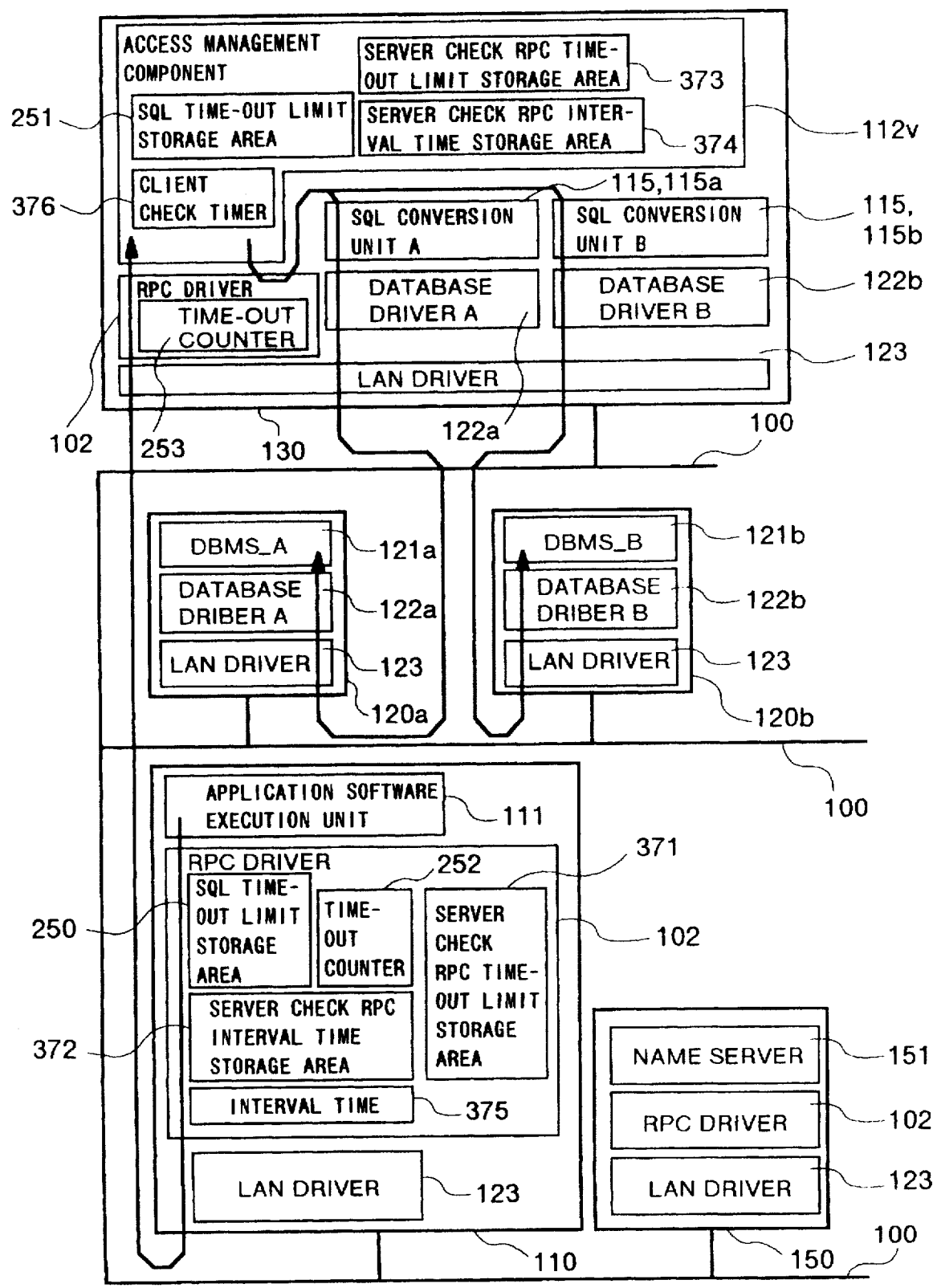
FIG. 37 is a diagram showing the configuration of a database access system according to the eighth embodiment.

Next, explanation will be made about an embodiment in which a server or client error is monitored. The configuration of a heterogeneous database access system according to the eighth embodiment is shown in FIG. 37. The heterogeneous database access system according to the eighth embodiment is substantially similar in configuration to the seventh embodiment. In this embodiment, however, as shown in FIG. 37, the main memory unit 1001 of the client information processing system 110, in addition to a SQL time-out limit storage area 250, has storage areas 371, 372 for holding the server check RPC time-out limit and the server check RPC interval time respectively. In similar fashion, the main memory unit 1001 of the gateway information processing system 130, in addition to a SQL time-out limit storage area 251, has storage areas 373, 374 for holding the server check RPC time-out limit and the server check RPC interval time respectively. Further, the RPC driver 102 of the client information processing system 110 according to this eighth embodiment, in addition to a time-out counter 252, has an interval timer 375 for counting the intervals at which the server check RPC is issued. The access management component 112v of the gateway information processing system 130, on the other hand, further includes a client check timer 376 for measuring the timing of checking the client operation.

The RPC driver 102 according to this eighth embodiment may include the first and/or second selection means as in the second embodiment. Also, each information processing system may include an external memory unit having the storage area which is otherwise included in the main memory unit 1001.

[Flow of SQL_RPC processing]

Figure 27:
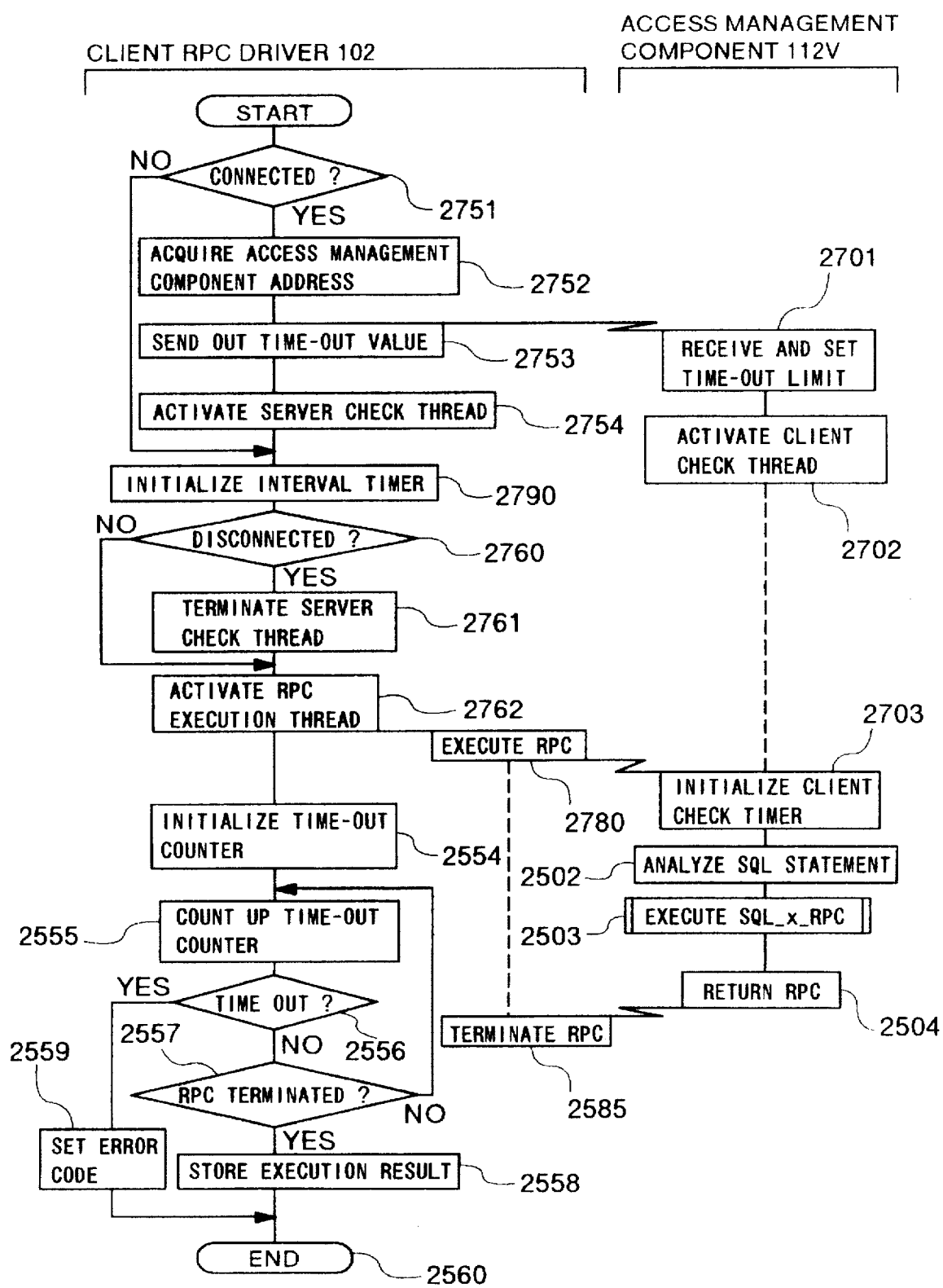
FIG. 27 is a flowchart showing the processing for the RPC issued to an access management component from a client information processing system according to an eighth embodiment.

The processing of SQL_RPC according to the eighth embodiment is shown in FIG. 27. The RPC driver 102 of the client information processing system 110 according to the eighth embodiment, upon receipt of the SQL_RPC issued from the application software execution unit 111, first decides whether the particular SQL_RPC is a statement for connection to a DBMS (step 2751). If it is a connecting statement, the process proceeds to steps 2752 to 2754, and then to 2790, while the process is passed directly to step 2790 if the SQL_RPC is not a connecting statement.

At step 2752, the RPC driver 102, like in the seventh embodiment, acquires the physical position of the access management component 112v. Step 2753 causes the RPC driver 102 to notify the access management component 112v of the server check RPC time-out limit held in the storage area 371 and the server check RPC interval time held in the storage area 372 in addition to the SQL time-out limit described with reference to the seventh embodiment. Next, the RPC driver 102 of the client activates the server check thread (step 2754).

The access management component 112v that has received the notification at step 2753 stores the SQL time-out limit, the server check RPC time-out limit and the server check RPC interval time in the storage areas 251, 273 and 274 respectively (step 2701). Also, the access management component 112v activates the client check thread (step 2702).

The RPC driver 102 of the client information processing system 110, on the other hand, after initializing the interval timer 375 (step 2790), checks to see whether the SQL statement is a disconnecting statement for cutting off the connection to the data base (step 2760), and if it is a disconnecting statement, terminates the server check thread that was activated at step 2754.

Then, the RPC driver 102 activates the RPC execution thread as in the seventh embodiment (step 2762). The RPC execution thread thus activated issues the RPC to and requests the access management component 112ν to process the RPC thus issued (step 2780), and waits for the processing termination notification from the access management component 112ν. The RPC server of the access management component 112ν that was requested to process the RPC initializes the client check timer 376 (step 2703) and analyzes the SQL statement (step 2502).

The continuation of the process mentioned above (steps 2554 to 2560, step 2585, steps 2502 to 2504) is the same as that shown in FIG. 25 according to the seventh embodiment.

[Processing of server check thread]

Figure 28:
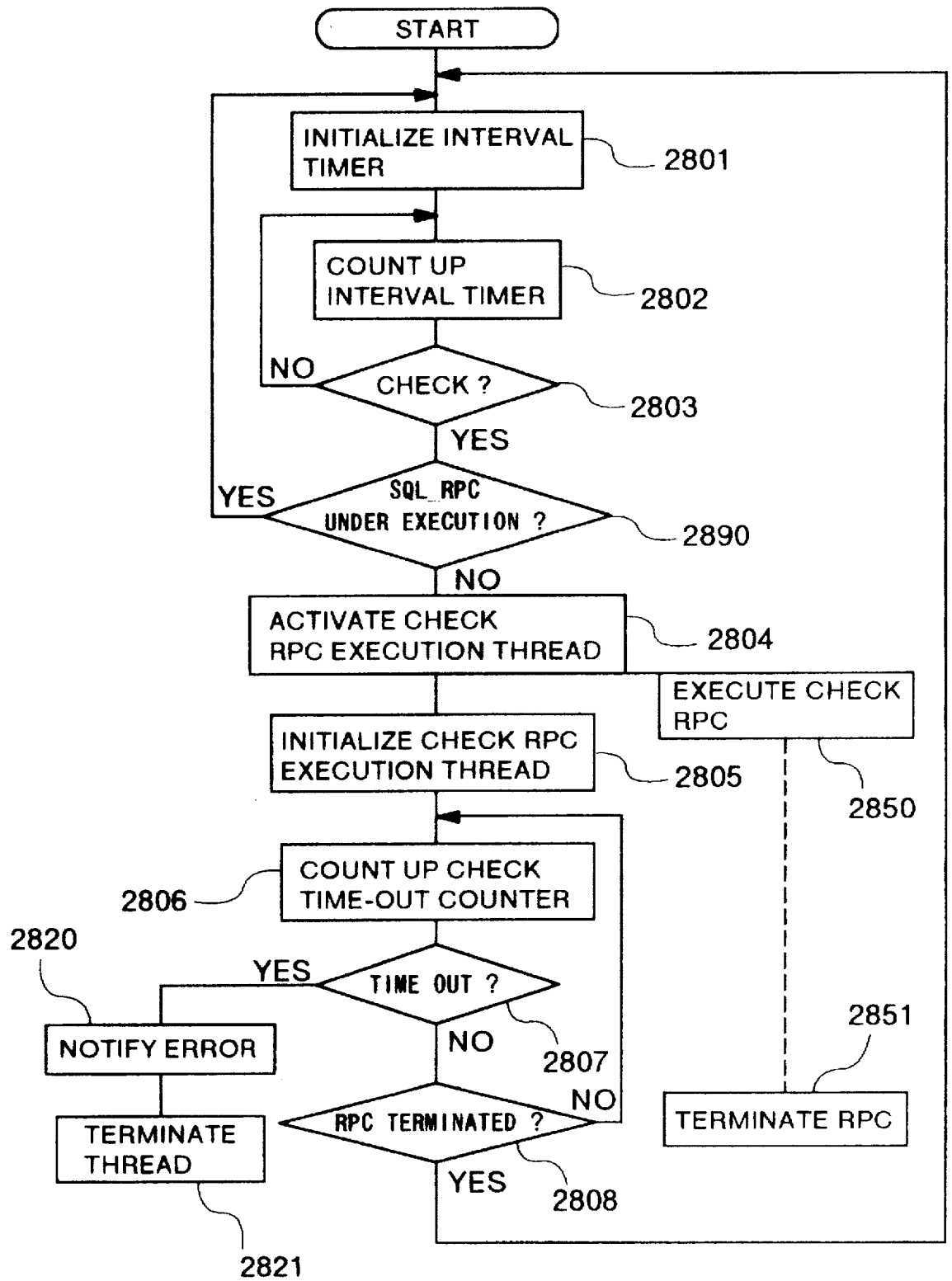
FIG. 28 is a flowchart showing the processing for a server check thread for monitoring a server error according to the eighth embodiment.

FIG. 28 shows the processing of the server check thread activated at step 2754 and terminated at step 2761.

The server check thread, upon activation, first initializes the interval timer 375 (step 2801), and repeatedly performs the process of counting up the interval timer 375 (step 2802) and checking whether the value held in the interval timer 375 has exceeded the server check RPC interval time held in the storage area 372 (step 2803). In this way, the server check thread waits until the value of the interval timer 375 reaches a predetermined server RPC interval time.

When the server check RPC interval time is reached, the server check thread checks to see whether the SQL_RPC processing is in execution (that is, whether the RPC execution thread is terminated or not in the embodiment under consideration) (step 2890). If the SQL_RPC processing is in execution, the process is returned to step 2801. In the case where the SQL_RPC is not in execution, the server check thread activates the server check RPC execution thread (step 2804).

The server check execution thread thus activated issues a server check RPC to the access management component 112ν and waits for a response (step 2850). The server check RPC is an RPC for nothing more then a predetermined simple designation to confirm whether the access management component 112ν providing an RPC server is in error or not. Upon termination of the processing by the access management component 112ν of the server check RPC, the server check RPC execution thread sets the server check RPC termination message and thus terminates the thread (step 2851).

The parent thread that has activated the server check RPC execution thread at step 2804, on the other hand, initializes the time-out counter 252 (step 2805), and then repeatedly performs the operation of counting up the time-out counter of step 2806, checking the time-out of step 2807 and checking the termination of the server check RPC execution thread of step 2808 until the lapse of a predetermined time length (the server check RPC time-out limit) or until the termination of the server check RPC execution thread. The time-out check at step 2807 is decided according to whether the value on the time-out counter 252 has reached the server check RPC time-out limit held in the storage area 371. Also, the RPC termination check of step 2808 is decided according to whether a termination message is already set at step 2851.

In the case where the predetermined time length is found to have elapsed as the result of time-out check at step 2807, the server check thread sets the error code at step 2820 and terminates the thread (step 2821). In the case where the server check RPC execution thread is found not yet terminated as the result of the server check RPC termination check at step 2808, on the other hand, the server check thread returns the process to step 2801.

In this way, the server can be checked for normal operation at intervals of a predetermined time length (server check RPC interval time) during the period from DBMS connection to disconnection.

According to the eighth embodiment, the server check RPC is regularly issued using the interval timer 375. In the case where the execution of the SQL_RPC processing competes with the server check RPC as the result of step 2890, however, the issuance of the server check RPC is cancelled and the interval timer 375 is initialized again (step 2801) to execute the timing operation again.

Further, the interval timer 375 is initialized at step 2790 (FIG. 27) each time the SQL_RPC is received by the RPC driver 102 of the client. Therefore, in the case where the SQL_RPC is not issued within the server check RPC interval time from the time point when the SQL_RPC or the server check RPC, whichever is issued later, the server check RPC is issued. The number of times of issuance of the server check RPC can thus be minimized as required.

[Processing of client check thread]

Figure 33:
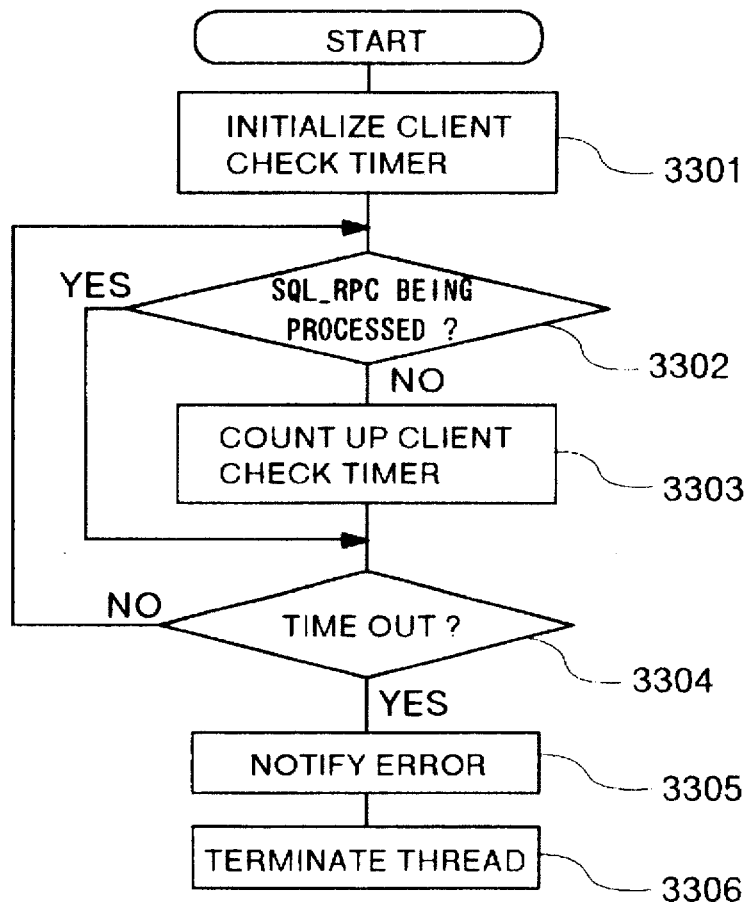
FIG. 33 is a flowchart showing the processing for the client check thread according to the eighth embodiment.

Now, the processing of the client check thread (client check processing execution means) activated at step 2702 (FIG. 27) will be explained with reference to FIG. 33.

The client check thread, upon activation, first initializes the client check timer 376 (step 3301), checks whether the SQL_RPC is being processed, and if not being processed, counts up the client check timer 376 (step 3303).

Next, the client check thread checks to see whether the value held in the client check timer 376 has reached the time-out limit (step 3304), and if the decision is that the time-out limit is not reached, returns the process to step 3302. The time-out limit is the time set on the basis of the value held in the server check RPC interval time storage area 374. This time is properly set to a time length 1.2 times to twice the server check RPC interval time considering the accuracy of the interval timer and the delay in the communication route.

In the case where step 3304 decides that the time-out limit has been reached, the client check thread notifies an error (step 3305) and terminates the thread (step 3306).

[Processing on server side of server check RPC]

Figure 34:
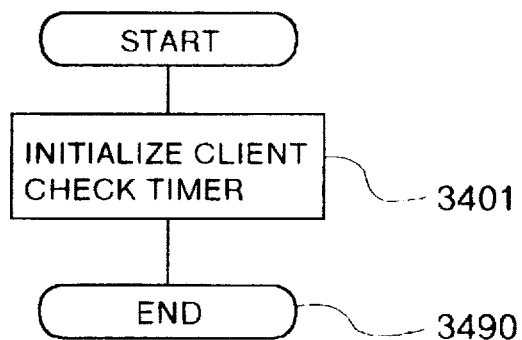
FIG. 34 is a flowchart showing the processing on server side for the server check RPC according to the eighth embodiment.

FIG. 34 shows the processing of the server check RPC on the server side. The access management component 112ν, upon receipt of the server check RPC issued at step 2850, initializes the client check timer 376 (step 3401), and terminates the process by termination notification (step 3490).

The initialization of the client check timer 376 (step 3401) is carried out, as shown by step 2703 of FIG. 27, also when the SQL_RPC is received for the SQL_RPC processing. The time-out check by the client check timer 376, therefore, is monitoring to see whether the server check RPC or the SQL_RPC is issued from the client within the time-out limit.

[Processing for mutual error check between access management component 112ν and SQL conversion unit 115]

Figure 32:
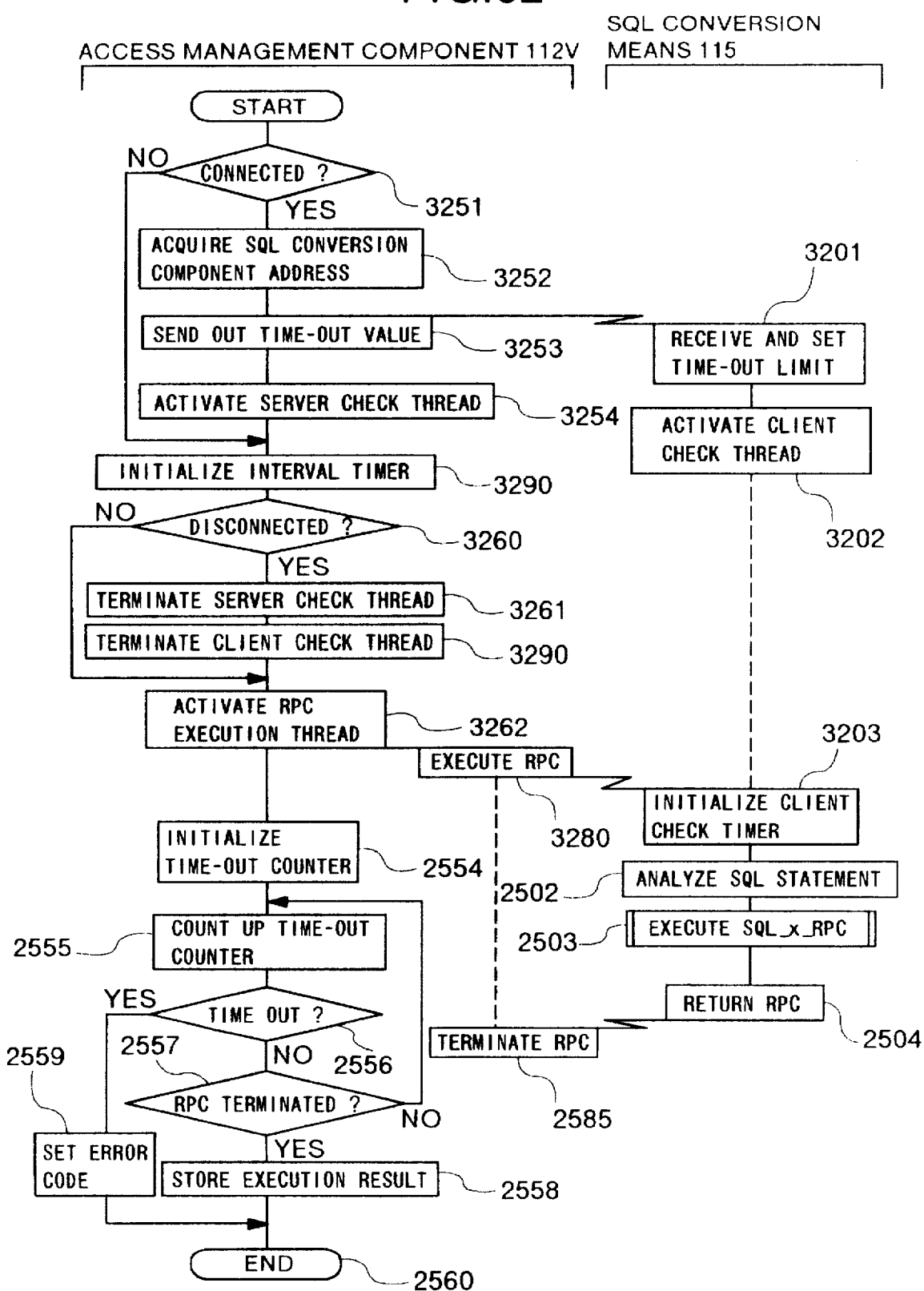
FIG. 32 is a flowchart showing the processing for the RPC issued to an SQL conversion_X component from an access management component according to the eighth embodiment.

The foregoing description concerns an example of the mutual error check carried out between the client RPC driver 102 and the access management component 112ν. The mutual error check between the access management component 112ν and the SQL conversion unit 115 can be implemented in similar fashion as shown in FIG. 32. The flow of operation for such a case is explained below.

First, the access management component 112ν, upon receipt of the SQL_RPC sent from the client RPC driver 102, decides whether or not the particular SQL_RPC is a statement for connection to a DBMS (step 3251), and if it is a connecting statement, executes steps 3252 to 3254 and passes the process to step 3290. In the case where the SQL_RPC is not a connecting statement, on the other hand, the process is directly passed to step 3290.

Step 3252 causes the access management component 112v to acquire the physical position of the SQL conversion unit 115. Step 3253 causes the access management component 112v to notify the SQL conversion unit 115 of the SQL time-out limit held in the storage area 251, the server check RPC time-out limit held in the storage area 373 and the server check RPC interval time held in the storage area 374. Then, the access management component 112v activates the server check thread (step 3254).

The SQL conversion unit 115 that has received the notification at step 3253 stores the SQL time-out limit, the server check RPC time-out limit and the server check RPC interval time in the related storage areas (not shown) (step 3201). Also, the SQL conversion unit 115 activates the client check thread (access management means check processing execution means) (step 3202).

The access management component 112v, on the other hand, initializes the interval timer 375 (step 3290), and then checks to see whether the SQL statement is a disconnecting statement for cutting off the connection with a data base (step 3260), and if it is a disconnecting statement, terminates the server check thread activated at step 3254 (step 3261).

Next, the access management component 112v activates the RPC execution thread (step 3262). The RPC execution thread thus activated issues the RPC to and requests the SQL conversion unit 115 to process the RPC (step 3280), and waits for a processing termination notification. The SQL conversion unit 115 that has been requested to process the RPC initializes the client check timer 376 (step 3203), and analyzes the SQL statement (step 2502).

The continuation of the above-mentioned processings (steps 2554 to 2560, step 2585, steps 2502 to 2504) is the same as the processings shown in FIG. 25 of the seventh embodiment.

[Example of time settings]

Figure 31:
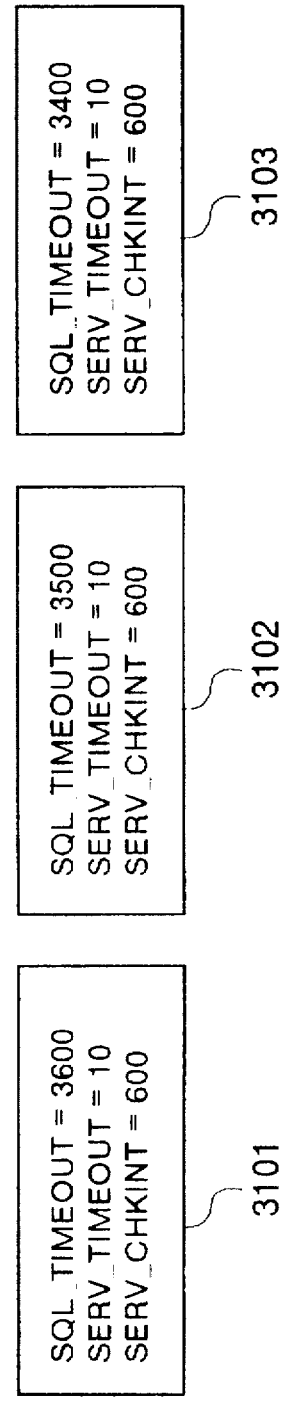
FIG. 31 is a diagram for explaining an example of time setting for error detection according to the seventh and eighth embodiments.

FIG. 31 shows example settings of the SQL time-out limit, the server check RPC time-out limit and the server check RPC interval time according to the aforementioned embodiments. In the present eighth embodiment, as shown in FIG. 31, the SQL time-out limit is stored and defined in a storage area of an environmental variable in the name of SQL_TIMEOUT, the server check RPC time-out limit in the name of SERV-TIMEOUT, and the server check RPC interval time in the name of SERV_CHKINT. These set values, which are an environmental variable according to the eighth embodiment, are not limited to it but may take any form that can be stored. The time is expressed in the unit of seconds in the example shown in FIG. 31.

The set values 3101 are environmental variables of the process of the application software execution unit 111 and the client RPC driver 102, and are set by the user or the application software execution unit 111. In the set values 3101, the SQL time-out limit is 3600 seconds, the server check RPC time-out limit is 10 seconds, and the server check RPC interval time is 600 seconds.

The set values 3102 are environmental variables of the process of the access management component 112v. These variables are set by the access management component 112v receiving the values of the settings 3101 from the client RPC driver 102 at the time of connection to the data base. In the set values 3102, the SQL time-out limit is 3500 seconds, the server check RPC time-out limit is 10 seconds, and the server check RPC interval time is 600 seconds. The SQL time-out limit is the received value less 100.

The set values 3103 are environmental variables of the process for the SQL conversion unit 115 which are the set values 3102 received and set by the SQL conversion unit 115 from the access management component 112v at the time of data base connection. In the set values 3103, the SQL time-out limit is 3400 seconds, the server check RPC time-out limit is 10 seconds, and the server check RPC interval time is 600 seconds. In this case, too, the SQL time-out limit is the received value less 100.

As described above, according to the present eighth embodiment, a server error is detected regularly by the use of the server check RPC for each set interval time, whereby a server error can be recognized before RPC execution for access to a data base. Also, error detection on the client side is possible by monitoring on the server side as to whether the server check RPC is regularly issued.

According to the eighth embodiment, the processing termination time for data base access can be set for each process of the application software execution unit. The appropriate processing termination time can thus be set according to applications. Further, in this eighth embodiment, the error of the DBMS or the component on the gateway information processing system can be detected before issuance of the SQL statement, thereby preventing the wasteful issuance of a SQL statement or generation of an error detection waiting time. Also, according to this embodiment, the error of the component on the access requesting side, i.e. the error of the component on the client side (in the case of the access management component 112v) or the error of the access management component 112v (in the case of the SQL conversion unit 115) can be detected. As a result, the process corresponding to the component in which a fault occurred can be terminated for the reason of a fault. In this way, the resources of the gateway information processing system such as the CPU 100 or the main memory unit 1001 can be effectively used by other processes.

The first to eighth embodiments described above are concerned with the case in which two types of DBMS having different SQL specifications coexisted. In spite of this, any number of types of DBMS may coexist, and the communication protocol as well as the SQL specification may be different. Also, although the foregoing explanation refers to the case in which each information processing system is connected by LAN, the connection may be made by any connection environment including WAN (wide area network) such as the telephone line or a connection environment of combined LAN and WAN. Further, the RPC according to the above-mentioned embodiments may use any interface mechanism capable of receiving the processing request and the processing result regardless of whether between programs within the same information processing system or between programs of different information processing systems. Selection of the gateway information processing system and the time-out monitoring are applicable with equal effect also to other distributed processing systems using the RPC as well as to the database access system. The first to eighth embodiments can be implemented in any combination.

A single SQL conversion unit 115 is capable of processing the database access to a plurality of DBMSs having the same SQL specification. As a result, it is not necessary to provide SQL conversion unit 115 for each DBMS in operation but at most as many SQL conversion unit as the types of DBMS operated, thus reducing the cost of the system as a whole.

According to this invention, the load can be distributed among a plurality of gateway information processing systems. Also, the present invention can reduce the overhead which otherwise might be caused by the intermediacy of the gateway information system. Further, according to the invention, it is possible to access a DBMS using a SQL of non-standard specification from an application software using a SQL of non-standard specification.

Also, according to the present invention, a free character code set can be used for each client application software. Furthermore, the present invention permits the use of a free character code set as a unit of connection from the application software execution unit to the DBMS.

According to the invention, upon the lapse of a time length arbitrarily set for each client application software, the processing involved can be terminated. Furthermore, according to the invention, an error of a DBMS or a component on the gateway information processing system can be detected before issuance of the SQL statement, and an error of the client in connection can be detected on the side of the gateway information processing system.

We claim:

1. A database access system comprising a plurality of server information processing systems each including a database management system for receiving a database access request described in a database access language and outputting a response, at least one client information processing system connected to said server information processing system and including means for executing an application software which outputs a request for accessing said database management system, and a gateway information processing system for receiving an access request described in the first database access language output from said application software execution means and sending said access request to said database management system, wherein:

said gateway information processing system includes database access language conversion means for converting said access request described in said first database access language into a request described in a second database access language different from said first database access language and sending the resulting access request to said database management system, and access management means for receiving said access request and sending said access request to said database access language conversion means, wherein said response outputted from said database management system is transmitted to said client information processing system through said database access language conversion means and said access management means;

said client information processing system includes means for outputting said request, establishing a connection with said access management means and sending said request to said access management means, and means for deciding processing related to said request as error in the case where there is no response received from said database management system after a lapse of a first predetermined time length from the transmission of said request to said access management means, thereafter terminating said connection;

said access management means includes a means for establishing a connection with said database access language conversion means upon receiving said request and sending said request to said database access language conversion means, and means for sending information indicating an error of processing related to said request to said client information processing system if there is no response received from said database management system after a lapse of a second predetermined time length from the transmission of said request to said database access language conversion means, thereafter terminating said connection; and, said database access language conversion means includes means for establishing a connection with said database management system upon receiving said request and sending said request to said database management system, and means for sending information indicating error of processings related to said request if there is no response received from said database management system after a lapse of a third predetermined time length for the transmission of said request to said database management system, thereafter terminating said connection, wherein said first predetermined time length set for said client information processing system is larger than said second predetermined time length set for said access management means and said second predetermined time length set for said access management means is larger than said third predetermined time length set for said database access language conversion time.

2. A database management system comprising a plurality of server information processing systems each including a database management system for receiving a database access request described in a database access language and outputting a response, at least one client information processing system connected to said server information processing system and including means for executing an application software which outputs a request for accessing said database management system, and a gateway information processing system for receiving an access request described in the first database access language outputted from said application software execution means and sending said access request to said database management system, wherein:

said gateway information processing system includes database access language conversion means for converting said access request described in said first database access language into a request described in a second database access language different from said first database access language and sending the resulting access request to said database management system, and access management means for receiving said access request and sending said access request to said database access language conversion means, wherein said response outputted from said database management system is transmitted to said client information processing system through said database access language conversion means and said access management means;

said access management means includes:
means for receiving said request, establishing a connection with said database access language conversion means and sending said request to said database access language conversion means,
means for sending information indicating a first predetermined time length set for said access management means to said database access language conversion means, wherein said database access conversion means uses said first predetermined time length as a time limit for said database access language conversion means, and
means for sending information indicating error of processings related to said request to said client information processing system if there is no response received from said database management system after the lapse of said first predetermined time length from the transmission of said request to said database language conversion means, thereafter terminating said connection; and said database access language conversion means includes means for establishing a connection with said database management system upon receiving said request and sending said request to said database management system, and means for sending information for indicating error of processing related to said request to said access management means if there is no response received from said database management system after a lapse of a second predetermined time length from the transmission of said request to said database management system, thereafter terminating said connections, said second predetermined time length being different from said first predetermined time length.

3. A database access system comprising a plurality of server information processing systems each including a database management system for receiving a database access request described in a database access language and outputting a response, at least one client information processing system connected to said server information processing system and including means for executing an application software which outputs a request for accessing said database management system, and a gateway information processing system for receiving an access request described in the first database access language output from said application software execution means and sending said access request to said database management system, wherein:

said gateway information processing system includes database access language conversion means for converting said access request described in said first database access language into a request described in a second database access language different from said first database access language and sending the resulting access request to said database management system, and access management means for receiving said access request and sending said access request to said database access language conversion means, wherein said response outputted from said database management system is transmitted to said client information processing system through said database access language conversion means and said access management means;

said client information processing system includes:
means for sending information indicating a first predetermined time length set for said client information processing system to said access management means, wherein said access management means uses said first predetermined time length contained in said information as a time limit for said access management means; and,
means for outputting said request, establishing a connection with said access management means and sending said request to said access management means, and means for deciding processing related to said request as error if there is no response received from said database management system after a lapse of said first predetermined time length from the transmission of said request to said access management means, thereafter terminating said connection, and said access management means includes a means for establishing a connection with said access language conversion means upon receiving said request and sending said request to said database access language conversion means, and means for sending information indicating an error of processing related to said request to said client information processing system if there is no response received from said database management system after a lapse of a second predetermined time length from the transmission of said request to said database access language conversion means, thereafter terminating said connection, said second predetermined time length being different from said first predetermined time length.

4. A database access system comprising a plurality of server information processing systems each including a database management system for receiving a database access request described in a database access language and outputting a response, at least one client information processing system connected to said server information processing system and including means for executing an application software which outputs a request for accessing said database management system, and a gateway information processing system for receiving an access request described in the first database access language output from said application software execution means and sending said access request to said database management system, wherein:

said gateway information processing system includes database access language conversion means for converting said access request described in said first database access language into a request described in a second database access language different from said first database access language and sending the resulting access request to said database management system, and access management means for receiving said access request and sending said access request to said database access language conversion means, wherein said response outputted from said database management system is transmitted to said client information processing system through said database access language conversion means and said access management means;

said client information processing system includes means for outputting said request, establishing a connection with said access management means and sending said request to said access management means, and means for deciding processing related to said request as error in the case if there is no response received from said database management system after a lapse of a first predetermined time length from the transmission of said request to said access management means, thereafter terminating said connection said access management means includes:
means for sending information indicating a second predetermined time length different from said first predetermined time length and set for said access management means to said database access language conversion means, wherein said database access language conversion means uses said second predetermined time length contained in said information as a time limit for said database access language conversion means; and
a means for establishing a connection with said access language conversion means upon receiving said request and sending said request to said database access language conversion means, and means for sending information indicating an error of processing related to said request to said client information processing system if there is no response received from said database management system after a lapse of said second predetermined time length from the transmission of said request to said database access language conversion means, thereafter terminating said connection, and said database access language conversion means includes means for establishing a connection with said database management system upon receiving said request and sending said request to said database management system, and means for sending information indicating error of processings related to said request if there is no response received from said database management system after a lapse of a third predetermined time length for the transmission of said request to said database management system, thereafter terminating said connection, said second predetermined time length being different from said first predetermined time length.

5. A database access system comprising a plurality of server information processing systems each including a database management system for receiving a database access request described in a database access language and outputting a response, at least one client information processing system connected to said server information processing system and including means for executing an application software which outputs a request for accessing said database management system, and a gateway information processing system for receiving an access request described in the first database access language output from said application software execution means and sending said access request to said database management system, wherein:

said gateway information processing system includes database access language conversion means for converting said access request described in said first database access language into a request described in a second database access language different from said first database access language and sending the resulting access request to said database management system, and access management means for receiving said access request and sending said access request to database access language conversion means, wherein said response outputted from said database management system is transmitted to said client information processing system through said database access language conversion means and said access management means;

said client information processing system includes:
means for sending information indicating a first predetermined time length set for said client information processing system to said access management means, and said access management means uses said first predetermined time as a time limit for said access management means, and, means for outputting said request, establishing a connection with said access management means and sending said request to said access management means, and means for deciding processing related to said request as error if there is no response received from said database management system after the lapse of said first predetermined time length from the transmission of said request to said access management means, thereafter terminating said connection; and said access management means includes:
means for sending information indicating a second predetermined time length set for said access management means to said database access language conversion means and said database access language conversion means uses said second predetermined time length contained in said information as a time limit for said database access language conversion means, and a means for establishing a connection with said access language conversion means upon receiving said request and sending said request to said database access language conversion means, and means for sending information indicating an error of processing related to said request to said client information processing system if there is no response received from said database management system after a lapse of said second predetermined time length from the transmission of said request to said database access language conversion means, thereafter terminating said connection, said second predetermined time length being different from said first predetermined time length.

* * * * *